US010402498B2

(12) United States Patent
Marcu et al.

(10) Patent No.: US 10,402,498 B2
(45) **Date of Patent: *Sep. 3, 2019**

(54) METHOD AND SYSTEM FOR AUTOMATIC MANAGEMENT OF REPUTATION OF TRANSLATORS

(71) Applicant: SDL Inc., Wakefield, MA (US)

(72) Inventors: Daniel Marcu, Manhattan Beach, CA (US); Markus Dreyer, Santa Monica, CA (US)

(73) Assignee: SDL Inc., Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,651

(22) Filed: Oct. 16, 2018

(65) Prior Publication Data

US 2019/0042566 A1 Feb. 7, 2019

Related U.S. Application Data

(63) Continuation of application No. 13/481,561, filed on May 25, 2012, now Pat. No. 10,261,994.

(51) Int. Cl.
*G06F 17/28* (2006.01)
*G06Q 10/06* (2012.01)

(52) U.S. Cl.
CPC ..... *G06F 17/2854* (2013.01); *G06Q 10/0639* (2013.01)

(58) Field of Classification Search
None
See application file for complete search history.

(56) References Cited

U.S. PATENT DOCUMENTS 4,055,907 A 11/1977 Henson
4,502,128 A 2/1985 Okajima et al.
(Continued)

FOREIGN PATENT DOCUMENTS

AU 5240198 A 5/1998
AU 694367 B2 7/1998
(Continued)

OTHER PUBLICATIONS

Abney, Steven P. , "Parsing by Chunks," 1991, Principle-Based Parsing: Computation and Psycholinguistics, vol. 44, pp. 257-279.
(Continued)

*Primary Examiner* — Neeraj Sharma
(74) *Attorney, Agent, or Firm* — Carr & Ferrell LLP

(57) ABSTRACT

The present invention provides a method that includes receiving a result word set in a target language representing a translation of a test word set in a source language. When the result word set is not in a set of acceptable translations, the method includes measuring a minimum number of edits to transform the result word set into a transform word set. The transform word set is in the set of acceptable translations. A system is provided that includes a receiver to receive a result word set and a counter to measure a minimum number of edits to transform the result word set into a transform word set. A method is provided that includes automatically determining a translation ability of a human translator based on a test result. The method also includes adjusting the translation ability of the human translator based on historical data of translations performed by the human translator.

20 Claims, 13 Drawing Sheets

(56) References Cited

U.S. PATENT DOCUMENTS 4,509,137 A 4/1985 Yoshida
4,599,691 A 7/1986 Sakaki et al.
4,615,002 A 9/1986 Innes
4,661,924 A 4/1987 Okamoto et al.
4,787,038 A 11/1988 Doi et al.
4,791,587 A 12/1988 Doi
4,800,522 A 1/1989 Miyao et al.
4,814,987 A 3/1989 Miyao et al.
4,845,658 A 7/1989 Gifford
4,916,614 A 4/1990 Kaji
4,920,499 A 4/1990 Skeirik
4,942,526 A 7/1990 Okajima et al.
4,980,829 A 12/1990 Okajima et al.
5,020,112 A 5/1991 Chou
5,088,038 A 2/1992 Tanaka et al.
5,091,876 A 2/1992 Kumano et al.
5,146,405 A 9/1992 Church
5,167,504 A 12/1992 Mann
5,175,684 A 12/1992 Chong
5,181,163 A 1/1993 Nakajima et al.
5,212,730 A 5/1993 Wheatley et al.
5,218,537 A 6/1993 Hemphill et al.
5,220,503 A 6/1993 Suzuki et al.
5,267,156 A 11/1993 Nomiyama
5,268,839 A 12/1993 Kaji
5,275,569 A 1/1994 Watkins
5,295,068 A 3/1994 Nishino et al.
5,302,132 A 4/1994 Corder
5,311,429 A 5/1994 Tominaga
5,351,189 A 9/1994 Doi
5,387,104 A 2/1995 Corder
5,408,410 A 4/1995 Kaji
5,418,717 A 5/1995 Su et al.
5,432,948 A 7/1995 Davis et al.
5,442,546 A 8/1995 Kaji et al.
5,458,425 A 10/1995 Torok
5,477,450 A 12/1995 Takeda et al.
5,477,451 A 12/1995 Brown et al.
5,488,725 A 1/1996 Turtle et al.
5,495,413 A 2/1996 Kutsumi et al.
5,497,319 A 3/1996 Chong et al.
5,510,981 A 4/1996 Berger et al.
5,528,491 A 6/1996 Kuno et al.
5,535,120 A 7/1996 Chong et al.
5,541,836 A 7/1996 Church et al.
5,541,837 A 7/1996 Fushimoto
5,548,508 A 8/1996 Nagami
5,587,902 A 12/1996 Kugimiya
5,640,575 A 6/1997 Maruyama
5,644,774 A 7/1997 Fukumochi et al.
5,675,815 A 10/1997 Yamauchi et al.
5,687,383 A 11/1997 Nakayama et al.
5,696,980 A 12/1997 Brew
5,708,780 A 1/1998 Levergood et al.
5,715,314 A 2/1998 Payne et al.
5,724,424 A 3/1998 Gifford
5,724,593 A 3/1998 Hargrave, III et al.
5,752,052 A 5/1998 Richardson et al.
5,754,972 A 5/1998 Baker et al.
5,761,631 A 6/1998 Nasukawa
5,761,689 A 6/1998 Rayson et al.
5,768,603 A 6/1998 Brown et al.
5,779,486 A 7/1998 Ho et al.
5,781,884 A 7/1998 Pereira et al.
5,794,178 A 8/1998 Caid et al.
5,805,832 A 9/1998 Brown et al.
5,806,032 A 9/1998 Sproat
5,812,776 A 9/1998 Gifford
5,819,265 A 10/1998 Ravin et al.
5,826,219 A 10/1998 Kutsumi
5,826,220 A 10/1998 Takeda et al.
5,845,143 A 12/1998 Yamauchi et al.
5,848,385 A 12/1998 Poznanski et al.
5,848,386 A 12/1998 Motoyama
5,850,561 A 12/1998 Church et al.
5,855,015 A 12/1998 Shoham
5,864,788 A 1/1999 Kutsumi
5,867,811 A 2/1999 O'Donoghue
5,870,706 A 2/1999 Alshawi
5,873,056 A 2/1999 Liddy
5,893,134 A 4/1999 O'Donoghue et al.
5,903,858 A 5/1999 Saraki
5,907,821 A 5/1999 Kaji et al.
5,909,492 A 6/1999 Payne et al.
5,909,681 A 6/1999 Passera et al.
5,917,944 A 6/1999 Wakisaka et al.
5,930,746 A 7/1999 Ting
5,960,384 A 9/1999 Brash
5,963,205 A 10/1999 Sotomayor
5,966,685 A 10/1999 Flanagan et al.
5,966,686 A 10/1999 Heidorn et al.
5,974,372 A 10/1999 Barnes
5,983,169 A 11/1999 Kozma
5,987,402 A 11/1999 Murata et al.
5,987,404 A 11/1999 Della Pietra et al.
5,991,710 A 11/1999 Papineni et al.
5,995,922 A 11/1999 Penteroudakis et al.
6,018,617 A 1/2000 Sweitzer et al.
6,031,984 A 2/2000 Walser
6,032,111 A 2/2000 Mohri
6,044,344 A 3/2000 Kanevsky
6,047,252 A 4/2000 Kumano et al.
6,049,785 A 4/2000 Gifford
6,064,819 A 5/2000 Franssen et al.
6,064,951 A 5/2000 Park et al.
6,073,143 A 6/2000 Nishikawa et al.
6,077,085 A 6/2000 Parry et al.
6,085,162 A 7/2000 Cherny
6,092,034 A 7/2000 McCarley et al.
6,119,077 A 9/2000 Shinozaki
6,119,078 A 9/2000 Kobayakawa et al.
6,131,082 A 10/2000 Hargrave, III et al.
6,161,082 A 12/2000 Goldberg et al.
6,182,014 B1 1/2001 Kenyon et al.
6,182,026 B1 1/2001 Tillmann et al.
6,182,027 B1 1/2001 Nasukawa et al.
6,185,524 B1 2/2001 Carus et al.
6,195,649 B1 2/2001 Gifford
6,199,051 B1 3/2001 Gifford
6,205,437 B1 3/2001 Gifford
6,205,456 B1 3/2001 Nakao
6,206,700 B1 3/2001 Brown et al.
6,212,634 B1 4/2001 Geer et al.
6,223,150 B1 4/2001 Duan et al.
6,233,544 B1 5/2001 Alshawi
6,233,545 B1 5/2001 Datig
6,233,546 B1 5/2001 Datig
6,236,958 B1 5/2001 Lange et al.
6,269,351 B1 7/2001 Black
6,275,789 B1 8/2001 Moser et al.
6,278,967 B1 8/2001 Akers et al.
6,278,969 B1 8/2001 King et al.
6,279,112 B1 8/2001 O'toole, Jr. et al.
6,285,978 B1 9/2001 Bernth et al.
6,289,302 B1 9/2001 Kuo
6,304,841 B1 10/2001 Berger et al.
6,311,152 B1 10/2001 Bai et al.
6,317,708 B1 11/2001 Witbrock et al.
6,327,568 B1 12/2001 Joost
6,330,529 B1 12/2001 Ito
6,330,530 B1 12/2001 Horiguchi et al.
6,356,864 B1 3/2002 Foltz et al.
6,356,865 B1 3/2002 Franz et al.
6,360,196 B1 3/2002 Poznanski et al.
6,389,387 B1 5/2002 Poznanski et al.
6,393,388 B1 5/2002 Franz et al.
6,393,389 B1 5/2002 Chanod et al.
6,415,250 B1 7/2002 van den Akker
6,415,257 B1 7/2002 Junqua
6,449,599 B1 9/2002 Payne et al.
6,460,015 B1 10/2002 Hetherington et al.
6,470,306 B1 10/2002 Pringle et al.
6,473,729 B1 10/2002 Gastaldo et al.
6,473,896 B1 10/2002 Hicken et al.

(56) References Cited

U.S. PATENT DOCUMENTS 6,477,524 B1 11/2002 Taskiran
6,480,698 B2 11/2002 Ho et al.
6,490,358 B1 12/2002 Geer et al.
6,490,549 B1 12/2002 Ulicny et al.
6,490,563 B2 12/2002 Hon
6,498,921 B1 12/2002 Ho et al.
6,502,064 B1 12/2002 Miyahira et al.
6,529,865 B1 3/2003 Duan et al.
6,535,842 B1 3/2003 Roche et al.
6,587,844 B1 7/2003 Mohri
6,598,046 B1 7/2003 Goldberg et al.
6,604,101 B1 8/2003 Chan et al.
6,609,087 B1 8/2003 Miller et al.
6,647,364 B1 11/2003 Yumura et al.
6,658,627 B1 12/2003 Gallup
6,691,279 B2 2/2004 Yoden et al.
6,704,741 B1 3/2004 Lively, Jr. et al.
6,745,161 B1 6/2004 Arnold et al.
6,745,176 B2 6/2004 Probert, Jr. et al.
6,757,646 B2 6/2004 Marchisio
6,778,949 B2 8/2004 Duan et al.
6,782,356 B1 8/2004 Lopke
6,810,374 B2 10/2004 Kang
6,848,080 B1 1/2005 Lee et al.
6,857,022 B1 2/2005 Scanlan
6,865,528 B1 3/2005 Huang
6,885,985 B2 4/2005 Hull
6,901,361 B1 5/2005 Portilla
6,904,402 B1 6/2005 Wang et al.
6,910,003 B1 6/2005 Arnold et al.
6,920,419 B2 7/2005 Kitamura
6,952,665 B1 10/2005 Shimomura et al.
6,976,207 B1 12/2005 Rujan
6,983,239 B1 1/2006 Epstein
6,990,439 B2 1/2006 Xun
6,993,473 B2 1/2006 Cartus
6,996,518 B2 2/2006 Jones et al.
6,996,520 B2 2/2006 Levin
6,999,925 B2 2/2006 Fischer et al.
7,013,262 B2 3/2006 Tokuda et al.
7,013,264 B2 3/2006 Dolan
7,016,827 B1 3/2006 Ramaswamy et al.
7,016,977 B1 3/2006 Dunsmoir et al.
7,024,351 B2 4/2006 Wang
7,031,908 B1 4/2006 Huang
7,031,911 B2 4/2006 Zhou et al.
7,050,964 B2 5/2006 Menzes et al.
7,054,803 B2 5/2006 Eisele
7,085,708 B2 8/2006 Manson
7,089,493 B2 8/2006 Hatori et al.
7,103,531 B2 9/2006 Moore
7,107,204 B1 9/2006 Liu et al.
7,107,215 B2 9/2006 Ghali
7,113,903 B1 9/2006 Riccardi et al.
7,124,092 B2 10/2006 O'toole, Jr. et al.
7,143,036 B2 11/2006 Weise
7,146,358 B1 12/2006 Gravano et al.
7,149,688 B2 12/2006 Schalkwyk
7,171,348 B2 1/2007 Scanlan
7,174,289 B2 2/2007 Sukehiro
7,177,792 B2 2/2007 Knight et al.
7,191,115 B2 3/2007 Moore
7,191,447 B1 3/2007 Ellis et al.
7,194,403 B2 3/2007 Okura et al.
7,197,451 B1 3/2007 Carter et al.
7,200,550 B2 4/2007 Menezes et al.
7,206,736 B2 4/2007 Moore
7,207,005 B2 4/2007 Laktritz
7,209,875 B2 4/2007 Quirk et al.
7,219,051 B2 5/2007 Moore
7,239,998 B2 7/2007 Xun
7,249,012 B2 7/2007 Moore
7,249,013 B2 7/2007 Al-Onaizan et al.
7,272,639 B1 9/2007 Levergood et al.
7,283,950 B2 10/2007 Pournasseh et al.
7,295,962 B2 11/2007 Marcu
7,295,963 B2 11/2007 Richardson et al.
7,302,392 B1 11/2007 Thenthiruperai et al.
7,319,949 B2 1/2008 Pinkham
7,328,156 B2 2/2008 Meliksetian et al.
7,333,927 B2 2/2008 Lee
7,340,388 B2 3/2008 Soricut et al.
7,346,487 B2 3/2008 Li
7,346,493 B2 3/2008 Ringger et al.
7,349,839 B2 3/2008 Moore
7,349,845 B2 3/2008 Coffman et al.
7,353,165 B2 4/2008 Zhou
7,356,457 B2 4/2008 Pinkham et al.
7,369,984 B2 5/2008 Fairweather
7,369,998 B2 5/2008 Sarich et al.
7,373,291 B2 5/2008 Garst
7,383,542 B2 6/2008 Richardson et al.
7,389,222 B1 6/2008 Langmead et al.
7,389,223 B2 6/2008 Atkin
7,389,234 B2 6/2008 Schmid et al.
7,403,890 B2 7/2008 Roushar
7,409,332 B2 8/2008 Moore
7,409,333 B2 8/2008 Wilkinson et al.
7,447,623 B2 11/2008 Appleby
7,448,040 B2 11/2008 Ellis et al.
7,451,125 B2 * 11/2008 Bangalore ............... G06F 17/27
706/47
7,454,326 B2 11/2008 Marcu et al.
7,496,497 B2 2/2009 Liu
7,509,313 B2 3/2009 Colledge
7,516,062 B2 4/2009 Chen et al.
7,533,013 B2 5/2009 Marcu
7,536,295 B2 5/2009 Cancedda et al.
7,546,235 B2 6/2009 Brockett et al.
7,552,053 B2 6/2009 Gao et al.
7,565,281 B2 7/2009 Appleby
7,574,347 B2 8/2009 Wang
7,580,828 B2 8/2009 D'Agostini
7,580,830 B2 8/2009 Al-Onaizan et al.
7,584,092 B2 9/2009 Brockett et al.
7,587,307 B2 9/2009 Cancedda et al.
7,620,538 B2 11/2009 Marcu et al.
7,620,549 B2 11/2009 Di Cristo et al.
7,620,632 B2 11/2009 Andrews
7,624,005 B2 11/2009 Koehn et al.
7,624,020 B2 11/2009 Yamada et al.
7,627,479 B2 12/2009 Travieso et al.
7,636,656 B1 12/2009 Nieh
7,668,782 B1 2/2010 Reistad et al.
7,680,646 B2 3/2010 Lux-Pogodalla et al.
7,680,647 B2 3/2010 Moore
7,689,405 B2 3/2010 Marcu
7,698,124 B2 4/2010 Menezes et al.
7,698,125 B2 4/2010 Graehl et al.
7,707,025 B2 4/2010 Whitelock
7,711,545 B2 5/2010 Koehn
7,716,037 B2 5/2010 Precoda et al.
7,734,459 B2 6/2010 Menezes
7,739,102 B2 6/2010 Bender
7,739,286 B2 6/2010 Sethy
7,788,087 B2 8/2010 Corston-Oliver
7,801,720 B2 9/2010 Satake et al.
7,813,918 B2 10/2010 Muslea et al.
7,822,596 B2 10/2010 Elgazzar et al.
7,865,358 B2 1/2011 Green
7,925,493 B2 4/2011 Watanabe
7,925,494 B2 4/2011 Cheng et al.
7,945,437 B2 5/2011 Mount et al.
7,957,953 B2 6/2011 Moore
7,974,833 B2 7/2011 Soricut et al.
7,974,843 B2 * 7/2011 Schneider ............. G10L 15/005
704/254
7,974,976 B2 7/2011 Yahia et al.
7,983,896 B2 7/2011 Ross et al.
7,983,897 B2 7/2011 Chin et al.
8,060,360 B2 11/2011 He
8,078,450 B2 12/2011 Anisimovich
8,135,575 B1 3/2012 Dean
8,145,472 B2 3/2012 Shore et al.

(56) References Cited

U.S. PATENT DOCUMENTS 8,195,447 B2 6/2012 Anismovich
8,214,196 B2 7/2012 Yamada et al.
8,219,382 B2 7/2012 Kim et al.
8,234,106 B2 7/2012 Marcu et al.
8,239,186 B2 8/2012 Chin
8,239,207 B2 8/2012 Seligman et al.
8,244,519 B2 8/2012 Bicici et al.
8,249,854 B2 8/2012 Nikitin et al.
8,265,923 B2 9/2012 Chatterjee et al.
8,275,600 B2 9/2012 Bilac et al.
8,286,185 B2 10/2012 Ellis et al.
8,296,127 B2 10/2012 Marcu et al.
8,315,850 B2 11/2012 Furuuchi et al.
8,326,598 B1 12/2012 Macherey et al.
8,352,244 B2 1/2013 Gao et al.
8,364,463 B2 1/2013 Miyamoto
8,380,486 B2 2/2013 Soricut et al.
8,386,234 B2 2/2013 Uchimoto et al.
8,423,346 B2 4/2013 Seo et al.
8,433,556 B2 4/2013 Fraser et al.
8,442,812 B2 5/2013 Ehsani
8,442,813 B1 5/2013 Popat
8,468,149 B1 6/2013 Lung et al.
8,504,351 B2 8/2013 Weibel et al.
8,521,506 B2 8/2013 Lancaster et al.
8,527,260 B2 9/2013 Best
8,543,563 B1 9/2013 Nikoulina et al.
8,548,794 B2 10/2013 Koehn
8,554,591 B2 10/2013 Reistad et al.
8,594,992 B2 11/2013 Kuhn et al.
8,600,728 B2 12/2013 Knight et al.
8,606,900 B1 12/2013 Levergood et al.
8,612,203 B2 12/2013 Foster et al.
8,612,205 B2 12/2013 Hanneman et al.
8,615,388 B2 12/2013 Li
8,615,389 B1 12/2013 Marcu
8,635,327 B1 1/2014 Levergood et al.
8,635,539 B2 1/2014 Young et al.
8,655,642 B2 2/2014 Fux et al.
8,666,725 B2 3/2014 Och
8,676,563 B2 3/2014 Soricut et al.
8,688,454 B2 4/2014 Zheng
8,694,303 B2 4/2014 Hopkins et al.
8,725,496 B2 5/2014 Zhao et al.
8,762,128 B1 6/2014 Brants et al.
8,768,686 B2 7/2014 Sarikaya et al.
8,775,154 B2 7/2014 Clinchant
8,818,790 B2 8/2014 He et al.
8,825,466 B1 9/2014 Wang et al.
8,831,928 B2 9/2014 Marcu et al.
8,843,359 B2 9/2014 Lauder
8,862,456 B2 10/2014 Krack et al.
8,886,515 B2 11/2014 Van Assche
8,886,517 B2 11/2014 Soricut et al.
8,886,518 B1 11/2014 Wang et al.
8,898,052 B2 11/2014 Waibel
8,903,707 B2 12/2014 Zhao
8,930,176 B2 1/2015 Li
8,935,148 B2 1/2015 Christ
8,935,149 B2 1/2015 Zhang
8,935,150 B2 1/2015 Christ
8,935,706 B2 1/2015 Ellis et al.
8,942,973 B2 1/2015 Viswanathan
8,943,080 B2 1/2015 Marcu et al.
8,972,268 B2 3/2015 Waibel
8,977,536 B2 3/2015 Och
8,990,064 B2 3/2015 Marcu et al.
9,026,425 B2 5/2015 Nikoulina
9,053,202 B2 6/2015 Viswanadha
9,081,762 B2 7/2015 Wu et al.
9,122,674 B1 9/2015 Wong et al.
9,141,606 B2 9/2015 Marciano
9,152,622 B2 10/2015 Marcu et al.
9,176,952 B2 11/2015 Aikawa
9,183,192 B1 11/2015 Ruby, Jr.
9,183,198 B2 11/2015 Shen et al.
9,197,736 B2 11/2015 Davis et al.
9,201,870 B2 12/2015 Jurach
9,208,144 B1 12/2015 Abdulnasyrov
9,213,694 B2 12/2015 Hieber et al.
9,396,184 B2 7/2016 Roy
9,465,797 B2 10/2016 Ji
9,471,563 B2 10/2016 Trese
9,519,640 B2 12/2016 Perez
9,552,355 B2 1/2017 Dymetman
9,600,473 B2 3/2017 Leydon
9,613,026 B2 4/2017 Hodson
10,319,252 B2 6/2019 Galley et al.
2001/0009009 A1 7/2001 Iizuka
2001/0029455 A1 10/2001 Chin et al.
2002/0002451 A1 1/2002 Sukehiro
2002/0013693 A1 1/2002 Fuji
2002/0040292 A1 4/2002 Marcu
2002/0046018 A1 4/2002 Marcu et al.
2002/0046262 A1 4/2002 Heilig et al.
2002/0059566 A1 5/2002 Delcambre et al.
2002/0078091 A1 6/2002 Vu et al.
2002/0083029 A1 6/2002 Chun et al.
2002/0083103 A1 6/2002 Ballance
2002/0086268 A1 7/2002 Shpiro
2002/0087313 A1 7/2002 Lee et al.
2002/0099744 A1 7/2002 Coden et al.
2002/0107683 A1 8/2002 Eisele
2002/0111788 A1 8/2002 Kimpara
2002/0111789 A1 8/2002 Hull
2002/0111967 A1 8/2002 Nagase
2002/0115044 A1 8/2002 Shpiro
2002/0124109 A1 9/2002 Brown
2002/0143537 A1 10/2002 Ozawa et al.
2002/0152063 A1 10/2002 Tokieda et al.
2002/0169592 A1 11/2002 Aityan
2002/0188438 A1 12/2002 Knight et al.
2002/0188439 A1 12/2002 Marcu
2002/0198699 A1 12/2002 Greene et al.
2002/0198701 A1 12/2002 Moore
2002/0198713 A1 12/2002 Franz et al.
2003/0004705 A1 1/2003 Kempe
2003/0009320 A1 1/2003 Furuta
2003/0009322 A1 1/2003 Marcu
2003/0014747 A1 1/2003 Spehr
2003/0023423 A1 1/2003 Yamada et al.
2003/0040900 A1 2/2003 D'Agostini
2003/0061022 A1 3/2003 Reinders
2003/0077559 A1 4/2003 Braunberger et al.
2003/0129571 A1 7/2003 Kim
2003/0144832 A1 7/2003 Harris
2003/0154071 A1 8/2003 Shreve
2003/0158723 A1 8/2003 Masuichi et al.
2003/0176995 A1 9/2003 Sukehiro
2003/0182102 A1 9/2003 Corston-Oliver et al.
2003/0191626 A1 10/2003 Al-Onaizan et al.
2003/0192046 A1 10/2003 Spehr
2003/0200094 A1 10/2003 Gupta
2003/0204400 A1 10/2003 Marcu et al.
2003/0216905 A1 11/2003 Chelba et al.
2003/0217052 A1 11/2003 Rubenczyk et al.
2003/0233222 A1 12/2003 Soricut et al.
2004/0006560 A1 1/2004 Chan et al.
2004/0015342 A1 1/2004 Garst
2004/0023193 A1 2/2004 Wen et al.
2004/0024581 A1 2/2004 Koehn et al.
2004/0030551 A1 2/2004 Marcu et al.
2004/0034520 A1 2/2004 Langkilde-Geary
2004/0044517 A1 3/2004 Palmquist
2004/0044530 A1 3/2004 Moore
2004/0059708 A1 3/2004 Dean et al.
2004/0059730 A1 3/2004 Zhou
2004/0068411 A1 4/2004 Scanlan
2004/0093327 A1 5/2004 Anderson et al.
2004/0098247 A1 5/2004 Moore
2004/0102956 A1 5/2004 Levin
2004/0102957 A1 5/2004 Levin
2004/0111253 A1 6/2004 Luo et al.
2004/0115597 A1 6/2004 Butt

(56) References Cited

U.S. PATENT DOCUMENTS

2004/0122656 A1 6/2004 Abir
2004/0167768 A1 8/2004 Travieso et al.
2004/0167784 A1 8/2004 Travieso et al.
2004/0176945 A1 9/2004 Inagaki et al.
2004/0193401 A1 9/2004 Ringger et al.
2004/0230418 A1 11/2004 Kitamura
2004/0237044 A1 11/2004 Travieso et al.
2004/0255281 A1 12/2004 Imamura et al.
2004/0260532 A1 12/2004 Richardson et al.
2005/0021322 A1 1/2005 Richardson et al.
2005/0021323 A1 1/2005 Li
2005/0021517 A1 1/2005 Marchisio
2005/0026131 A1 2/2005 Elzinga et al.
2005/0033565 A1 2/2005 Koehn
2005/0038643 A1 2/2005 Koehn
2005/0054444 A1 3/2005 Okada
2005/0055199 A1 3/2005 Ryzchachkin et al.
2005/0055217 A1 3/2005 Sumita et al.
2005/0060160 A1 3/2005 Roh et al.
2005/0075858 A1 4/2005 Pournasseh et al.
2005/0086226 A1 4/2005 Krachman
2005/0102130 A1 5/2005 Quirk et al.
2005/0107999 A1 5/2005 Kempe et al.
2005/0125218 A1 6/2005 Rajput et al.
2005/0149315 A1 7/2005 Flanagan et al.
2005/0171757 A1 8/2005 Appleby
2005/0171944 A1 8/2005 Palmquist
2005/0204002 A1 9/2005 Friend
2005/0228640 A1 10/2005 Aue et al.
2005/0228642 A1 10/2005 Mau et al.
2005/0228643 A1 10/2005 Munteanu et al.
2005/0234701 A1 10/2005 Graehl et al.
2005/0267738 A1 12/2005 Wilkinson et al.
2006/0004563 A1 1/2006 Campbell et al.
2006/0015320 A1 1/2006 Och
2006/0015323 A1 1/2006 Udupa et al.
2006/0018541 A1 1/2006 Chelba et al.
2006/0020448 A1 1/2006 Chelba et al.
2006/0041428 A1 2/2006 Fritsch et al.
2006/0095248 A1 5/2006 Menezes et al.
2006/0095526 A1 5/2006 Levergood et al.
2006/0111891 A1 5/2006 Menezes et al.
2006/0111892 A1 5/2006 Menezes et al.
2006/0111896 A1 5/2006 Menezes et al.
2006/0129424 A1 6/2006 Chan
2006/0136193 A1 6/2006 Lux-Pogodalla et al.
2006/0136824 A1 6/2006 Lin
2006/0142995 A1 6/2006 Knight et al.
2006/0150069 A1 7/2006 Chang
2006/0165040 A1 7/2006 Rathod et al.
2006/0167984 A1 7/2006 Fellenstein et al.
2006/0190241 A1 8/2006 Goutte et al.
2006/0282255 A1 12/2006 Lu et al.
2007/0010989 A1 1/2007 Faruquie et al.
2007/0015121 A1 1/2007 Johnson et al.
2007/0016400 A1 1/2007 Soricutt et al.
2007/0016401 A1 1/2007 Ehsani et al.
2007/0016918 A1 1/2007 Alcorn et al.
2007/0020604 A1 1/2007 Chulet
2007/0033001 A1 2/2007 Muslea et al.
2007/0043553 A1 2/2007 Dolan
2007/0050182 A1 3/2007 Sneddon et al.
2007/0060114 A1 3/2007 Ramer et al.
2007/0073532 A1 3/2007 Brockett et al.
2007/0078654 A1 4/2007 Moore
2007/0078845 A1 4/2007 Scott et al.
2007/0083357 A1 4/2007 Moore et al.
2007/0094169 A1 4/2007 Yamada et al.
2007/0112553 A1 5/2007 Jacobson
2007/0112555 A1 5/2007 Lavi et al.
2007/0112556 A1 5/2007 Lavi et al.
2007/0122792 A1 5/2007 Galley et al.
2007/0168202 A1 7/2007 Changela et al.
2007/0168450 A1 7/2007 Prajapat et al.
2007/0180373 A1 8/2007 Bauman et al.
2007/0208719 A1 9/2007 Tran
2007/0219774 A1 9/2007 Quirk et al.
2007/0233460 A1 10/2007 Lancaster et al.
2007/0233547 A1 10/2007 Younger et al.
2007/0250306 A1 10/2007 Marcu et al.
2007/0265825 A1 11/2007 Cancedda et al.
2007/0265826 A1 11/2007 Chen et al.
2007/0269775 A1 11/2007 Andreev et al.
2007/0294076 A1 12/2007 Shore et al.
2008/0040095 A1 2/2008 Sinha et al.
2008/0046229 A1* 2/2008 Maskey .............. G06F 17/2775 704/2
2008/0052061 A1 2/2008 Kim et al.
2008/0065478 A1 3/2008 Kohlmeier et al.
2008/0065974 A1 3/2008 Campbell
2008/0086298 A1 4/2008 Anismovich
2008/0109209 A1 5/2008 Fraser et al.
2008/0109374 A1 5/2008 Levergood et al.
2008/0114583 A1 5/2008 Al-Onaizan et al.
2008/0154577 A1 6/2008 Kim et al.
2008/0154581 A1 6/2008 Lavi et al.
2008/0183555 A1 7/2008 Walk
2008/0195461 A1 8/2008 Li et al.
2008/0201344 A1 8/2008 Levergood et al.
2008/0215418 A1 9/2008 Kolve et al.
2008/0243450 A1* 10/2008 Feblowitz ................. G06F 8/10 703/2
2008/0249760 A1 10/2008 Marcu et al.
2008/0270109 A1 10/2008 Och
2008/0270112 A1 10/2008 Shimohata
2008/0281578 A1 11/2008 Kumaran et al.
2008/0288240 A1 11/2008 D'Agostini
2008/0300857 A1 12/2008 Barbaiani et al.
2008/0307481 A1 12/2008 Panje
2009/0076792 A1 3/2009 Lawson-Tancred
2009/0083023 A1 3/2009 Foster et al.
2009/0094017 A1 4/2009 Chen
2009/0106017 A1 4/2009 D'Agostini
2009/0119091 A1 5/2009 Sarig
2009/0125497 A1 5/2009 Jiang et al.
2009/0198487 A1 8/2009 Wong et al.
2009/0217196 A1 8/2009 Neff et al.
2009/0234634 A1 9/2009 Chen et al.
2009/0234635 A1 9/2009 Bhatt et al.
2009/0240539 A1 9/2009 Slawson
2009/0241115 A1 9/2009 Raffo et al.
2009/0248662 A1 10/2009 Murdock
2009/0313005 A1 12/2009 Jaquinta
2009/0313006 A1 12/2009 Tang
2009/0326912 A1 12/2009 Ueffing
2009/0326913 A1 12/2009 Simard et al.
2010/0005086 A1 1/2010 Wang et al.
2010/0017293 A1 1/2010 Lung et al.
2010/0042398 A1 2/2010 Marcu et al.
2010/0057439 A1 3/2010 Ideuchi et al.
2010/0057561 A1 3/2010 Gifford
2010/0082326 A1 4/2010 Bangalore et al.
2010/0121630 A1 5/2010 Mende et al.
2010/0138210 A1 6/2010 Seo et al.
2010/0138213 A1 6/2010 Bicici et al.
2010/0158238 A1 6/2010 Saushkin
2010/0174524 A1 7/2010 Koehn
2010/0179803 A1 7/2010 Sawaf
2010/0204978 A1 8/2010 Gao et al.
2011/0029300 A1 2/2011 Marcu et al.
2011/0066469 A1 3/2011 Kadosh
2011/0066643 A1 3/2011 Cooper et al.
2011/0082683 A1 4/2011 Soricut et al.
2011/0082684 A1 4/2011 Soricut et al.
2011/0097693 A1 4/2011 Crawford
2011/0184722 A1 7/2011 Sneddon et al.
2011/0191096 A1 8/2011 Sarikaya et al.
2011/0191410 A1 8/2011 Refuah et al.
2011/0202330 A1* 8/2011 Dai ..................... G06F 17/2755 704/2
2011/0225104 A1 9/2011 Soricut et al.
2011/0289405 A1 11/2011 Fritsch et al.
2011/0307241 A1 12/2011 Weibel et al.
2012/0016657 A1 1/2012 He et al.

(56) References Cited

U.S. PATENT DOCUMENTS

| | | | |
|---|---|---|---|
| 2012/0022852 A1 | 1/2012 | Tregaskis | |
| 2012/0096019 A1 | 4/2012 | Manickam et al. | |
| 2012/0116751 A1 | 5/2012 | Bernardini et al. | |
| 2012/0136646 A1 | 5/2012 | Kraenzel et al. | |
| 2012/0150441 A1 | 6/2012 | Ma et al. | |
| 2012/0150529 A1 | 6/2012 | Kim et al. | |
| 2012/0185478 A1* | 7/2012 | Topham | G06F 16/313 707/737 |
| 2012/0191457 A1 | 7/2012 | Minnis et al. | |
| 2012/0203776 A1 | 8/2012 | Nissan | |
| 2012/0232885 A1 | 9/2012 | Barbosa et al. | |
| 2012/0253783 A1 | 10/2012 | Castelli et al. | |
| 2012/0265711 A1 | 10/2012 | Assche | |
| 2012/0278302 A1 | 11/2012 | Choudhury et al. | |
| 2012/0278356 A1* | 11/2012 | Furuta | G06F 17/2223 707/769 |
| 2012/0323554 A1 | 12/2012 | Hopkins et al. | |
| 2012/0330990 A1 | 12/2012 | Chen et al. | |
| 2013/0018650 A1 | 1/2013 | Moore et al. | |
| 2013/0024184 A1 | 1/2013 | Vogel et al. | |
| 2013/0103381 A1 | 4/2013 | Assche | |
| 2013/0124185 A1 | 5/2013 | Sarr et al. | |
| 2013/0144594 A1 | 6/2013 | Bangalore et al. | |
| 2013/0173247 A1 | 7/2013 | Hodson | |
| 2013/0226563 A1* | 8/2013 | Hirate | G06F 17/2795 704/9 |
| 2013/0226945 A1* | 8/2013 | Swinson | G06Q 30/0283 707/758 |
| 2013/0238310 A1 | 9/2013 | Viswanathan | |
| 2013/0290339 A1 | 10/2013 | LuVogt et al. | |
| 2013/0325442 A1 | 12/2013 | Dahlmeier | |
| 2014/0006003 A1 | 1/2014 | Soricut et al. | |
| 2014/0019114 A1 | 1/2014 | Travieso et al. | |
| 2014/0058718 A1 | 2/2014 | Kunchukuttan | |
| 2014/0142917 A1 | 5/2014 | D'Penha | |
| 2014/0142918 A1 | 5/2014 | Dotterer | |
| 2014/0149102 A1 | 5/2014 | Marcu et al. | |
| 2014/0188453 A1 | 7/2014 | Marcu et al. | |
| 2014/0229257 A1 | 8/2014 | Reistad et al. | |
| 2014/0297252 A1 | 10/2014 | Prasad et al. | |
| 2014/0350931 A1 | 11/2014 | Levit et al. | |
| 2014/0358519 A1 | 12/2014 | Mirkin | |
| 2014/0358524 A1 | 12/2014 | Papula | |
| 2014/0365201 A1 | 12/2014 | Gao | |
| 2015/0051896 A1 | 2/2015 | Simard et al. | |
| 2015/0106076 A1 | 4/2015 | Hieber et al. | |
| 2015/0186362 A1 | 7/2015 | Li | |

FOREIGN PATENT DOCUMENTS

| | | | |
|---|---|---|---|
| AU | 5202299 | A | 10/1999 |
| CA | 2221506 | A1 | 12/1996 |
| CA | 2408819 | | 11/2006 |
| CA | 2475857 | | 12/2008 |
| CA | 2480398 | | 6/2011 |
| CN | 102193914 | A | 9/2011 |
| CN | 102662935 | A | 9/2012 |
| CN | 102902667 | A | 1/2013 |
| DE | 69525374 | T2 | 8/2002 |
| DE | 69431306 | T2 | 5/2003 |
| DE | 69633564 | T2 | 11/2005 |
| DE | 202005022113.9 | | 12/2014 |
| EP | 0469884 | | 2/1992 |
| EP | 0715265 | | 6/1996 |
| EP | 0830774 | A2 | 3/1998 |
| EP | 0933712 | A2 | 8/1999 |
| EP | 0933712 | A3 | 1/2001 |
| EP | 1128301 | A2 | 8/2001 |
| EP | 1128302 | A2 | 8/2001 |
| EP | 1128303 | A2 | 8/2001 |
| EP | 0803103 | A1 | 2/2002 |
| EP | 1235177 | A2 | 8/2002 |
| EP | 0734556 | B1 | 9/2002 |
| EP | 1488338 | A2 | 9/2004 |
| EP | 0830774 | B1 | 10/2004 |
| EP | 1489523 | A2 | 12/2004 |
| EP | 1488338 | B1 | 4/2010 |
| EP | 2299369 | A1 | 3/2011 |
| GB | 2241359 | A | 8/1991 |
| JP | 07244666 | | 9/1995 |
| JP | H08101837 | A | 4/1996 |
| JP | 10011447 | | 1/1998 |
| JP | H10509543 | A | 9/1998 |
| JP | H11507752 | A | 7/1999 |
| JP | 11272672 | | 10/1999 |
| JP | 3190881 | B2 | 7/2001 |
| JP | 3190882 | B2 | 7/2001 |
| JP | 3260693 | B2 | 2/2002 |
| JP | 3367675 | B2 | 1/2003 |
| JP | 2003157402 | A | 5/2003 |
| JP | 2004501429 | | 1/2004 |
| JP | 2004062726 | | 2/2004 |
| JP | 3762882 | B2 | 4/2006 |
| JP | 2006216073 | A | 8/2006 |
| JP | 2007042127 | A | 2/2007 |
| JP | 4485548 | B2 | 6/2010 |
| JP | 4669373 | B2 | 4/2011 |
| JP | 4669430 | B2 | 4/2011 |
| JP | 5452868 | B2 | 1/2014 |
| WO | WO9516971 | A1 | 6/1995 |
| WO | WO9613013 | A1 | 5/1996 |
| WO | WO9642041 | A2 | 12/1996 |
| WO | WO9715885 | A1 | 5/1997 |
| WO | WO9819224 | A2 | 5/1998 |
| WO | WO9952626 | A1 | 10/1999 |
| WO | WO2002039318 | A1 | 5/2002 |
| WO | WO2003083709 | | 10/2003 |
| WO | WO2003083710 | A2 | 10/2003 |
| WO | WO2004042615 | | 5/2004 |
| WO | WO2007056563 | | 5/2007 |
| WO | WO2007068123 | A1 | 6/2007 |
| WO | WO2010062540 | A1 | 6/2010 |
| WO | WO2010062542 | A1 | 6/2010 |
| WO | WO2011041675 | | 4/2011 |
| WO | WO2011162947 | | 12/2011 |

OTHER PUBLICATIONS

Agbago, A., et al., "Truecasing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Association for Artificial Intelligence, Austin, TX, pp. 672-678.

Al-Onaizan, Y. and Knight K., "Machine Transliteration of Names in Arabic Text," Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennsylvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-Star Workshop on Speech-to-Speech Translation (Barcelona, Spain), Jun. 2006, pp. 37-41.

(56) References Cited

OTHER PUBLICATIONS

Ballesteros, L. et al., "Phrasal Translation and Query Expansion Techniques for Cross-Language Information Retrieval," SIGIR 97, Philadelphia, PA, © 1997, pp. 84-91.
Bangalore, S. and Rambow, O., "Evaluation Metrics for Generation," 2000, Proc. of the 1st International Natural Language Generation Conf., vol. 14, pp. 1-8.
Bangalore, S. and Rambow, O., "Using TAGs, a Tree Model, and a Language Model for Generation," May 2000, Workshop TAG+5, Paris.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005), Annual Meeting of the ACL Assoc. for Computational Linguistics, Morristown, NJ, 597-604. DOI=http://dx.doi.org/10.3115/1219840.
Barnett et al., "Knowledge and Natural Language Processing," Aug. 1990, Communications of the ACM, vol. 33, Issue 8, pp. 50-71.
Baum, L., "An Inequality and Associated Maximization Technique in Statistical Estimation for Probabilistic Functions of Markov Processes", 1972, Inequalities 3:1-8.
Berhe, G. et al., "Modeling Service-based Multimedia Content Adaptation in Pervasive Computing," CF '04 (Ischia, Italy) Apr. 14-16, 2004, pp. 60-69.
Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.
Brants, T., "TnT—A Statistical Part-of-Speech Tagger," 2000, Proc. of the 6th Applied Natural Language Processing Conference, Seattle.
Brill, E., "Transformation-Based Error-Driven Learning and Natural Language Processing: A Case Study in Part of Speech Tagging", 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER 'Experiments with INQUERY," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Carl, M. "A Constructivist Approach to Machine Translation," 1998, New Methods of Language Processing and Computational Natural Language Learning, pp. 247-256.
Chen, et al., "Machine Translation: An Integrated Approach," 1995, Proc. of 6th Int'l Cont. on Theoretical and Methodological Issue in MT, pp. 287-294.
Cheng et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Yossi, Cohen "Interpreter for FUF," available at URL <ftp://ftp.cs.bgu.ac.il/pub/people/elhadad/fuf-life.lf> (downloaded Jun. 1, 2008).
Corston-Oliver, S., "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996,vol. 22, No. 4, pp. 481-496.
Dagan et al., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab et al., "A Statistical Word-Level Translation Model for Comparable Corpora," 2000, In Proc. of the Conference on Content Based Multimedia Information Access (RIAO).
Diab, M., "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason, "Learning Non-Isomorphic Tree Mappings for Machine Translation," 2003, in Proc. of the 41st Meeting of the ACL, pp.205-208.
Elhadad et al., "Floating Constraints in Lexical Choice", 1996, ACL, vol. 23 No. 2, pp. 195-239.
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad, Michael, "FUF: the Universal Unifier User Manual Version 5.2", 1993, Department of Computer Science, Ben Gurion University, Beer Sheva, Israel.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [Front Matter].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Zhang, R. et al., "The NiCT-ATR Statistical Machine Translation System for the IWSLT 2006 Evaluation," submitted to IWSLT, 2006.

(56) References Cited

OTHER PUBLICATIONS

Russell, S. and Norvig, P., "Artificial Intelligence: A Modern Approach," 1995, Prentice-Hall, Inc., New Jersey [Front Matter].
Sang, E. and Buchholz, S., "Introduction to the CoNLL-2000 Shared Task: Chunking," 2002, Proc. of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disambiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Kumar, S. and Byrne, W., "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2,1992, John Wiley & Sons Inc; "Unification" article, K. Knight, pp. 1630-1637.
Shirai, S., "A Hybrid Rule and Example-based Method for Machine Translation," 1997, NTT Communication Science Laboratories, pp. 1-5. Dec. 1997.
Sobashima et al., "A Bidirectional Transfer-Driven Machine Translation System for Spoken Dialogues," 1994, Proc. of 15th Conference on Computational Linguistics, vol. 1, pp. 64-68.
Soricut et al., "Using a Large Monolingual Corpus to Improve Translation Accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workshop on Computational Approaches to Semitic Language.
Sumita et al., "A Discourse Structure Analyzer for Japanese Text," 1992, Proc. of the International Conference on Fifth Generation Computer Systems, vol. 2, pp. 1133-1140.
Sun et al., "Chinese Named Entity Identification Using Class-based Language Model," 2002, Proc. of 19th International Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Taylor et al., "The Penn Treebank: An Overview," in A. Abeill (ed.), D Treebanks: Building and Using Corpora, Parsed 2003, pp. 5-22.
Tiedemann, Jorg, "Automatic Construction of Weighted String Similarity Measures," 1999, In Proceedings of the Joint SIGDAT Conference on Empirical Methods in Natural Language Processing and Very Large Corpora.
Tillman, C. and Xia, F., "A Phrase-Based Unigram Model for Statistical Machine Translation," 2003, Proc. of the North American Chapter of the ACL on Human Language Technology, vol. 2, pp. 106-108. Mar. 2003.
Tillmann et al., "A DP Based Search Using Monotone Alignments in Statistical Translation," 1997, Proc. of the Annual Meeting of the ACL, pp. 366-372.
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural Language Processing (Shizen Gengo Shori), vol. 10, No. 3, Apr. 2003, pp. 87-114.
Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods in Natural Language Processing (EMNLP), pp. 156-163.
Varga et al., "Parallel Corpora for Medium Density Languages", In Proceedings of RANLP 2005, pp. 590-596.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Vogel, S. and Ney, H., "Construction of a Hierarchical Translation Memory," 2000, Proc. of Cooling 2000, Saarbrucken, Germany, pp. 1131-1135.
Wang, Y. and Waibel, A., "Decoding Algorithm in Statistical Meeting Machine Translation," 1996, Proc. of the 35th Annual of the ACL, pp. 366-372.
Wang, Ye-Yi, "Grammar Inference and Statistical Machine Translation," 1998, Ph.D Thesis, Carnegie Mellon University, Pittsburgh, PA.
Watanabe et al., "Statistical Machine Translation Based on Hierarchical Phrase Alignment," 2002, 9th International Conference on Theoretical and Methodological Issues in Machine Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wu, Dekai, "A Polynomial-Time Algorithm for Statistical Machine Translation," 1996, Proc. of 34th Annual Meeting of the ACL, pp. 152-158.
Wu, Dekai, "Stochastic Inversion Transduction Grammars and Bilingual Parsing of Parallel Corpora," 1997, Computational Linguistics, vol. 23, Issue 3, pp. 377-403.
Yamada, K. and Knight, K. "A Syntax-Based Statistical Translation Model," 2001, Proc. of the 39th Annual Meeting of the ACL, pp. 523-530.
Yamada, K. and Knight, K., "A Decoder for Syntax-Based Statistical MT," 2001, Proceedings of the 40th Annual Meeting of the ACL, pp. 303-310.
Yamada K., "A Syntax-Based Statistical Translation Model," 2002 PhD Dissertation, pp. 1-141.
Yamamoto et al., "A Comparative Study on Translation Units for Bilingual Lexicon Extraction," 2001, Japan Academic Association for Copyright Clearance, Tokyo, Japan.
Yamamoto et al, "Acquisition of Phrase-level Bilingual Correspondence using Dependency Structure" In Proceedings of COLING-2000, pp. 933-939.
Yarowsky, David, "Unsupervised Word Sense Disambiguation Rivaling Supervised Methods," 1995, 33rd Annual Meeting of the ACL, pp. 189-196.
Zhang et al., "Synchronous Binarization for Machine Translations," Jun. 4-9, 2006, In Proc. of the Human Language Technology Conference of the North American Chapter of the ACL, pp. 256-263.
Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
Elhadad, Michael, "Using Argumentation to Control Lexical Choice: A Functional Unification Implementation", 1992, Ph.D. Thesis, Graduate School of Arts and Sciences, Columbia University.
Elhadad, M. and Robin, J., "Surge: a Comprehensive Plug-in Syntactic Realization Component for Text Generation", 1999 (available at http://www.cs.bgu.ac.il/-elhadad/pub.html).

(56) References Cited

OTHER PUBLICATIONS

Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Linguistics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>, retrieved on May 6, 2004, abstract.
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Fung, Pascale, "Compiling Bilingual Lexicon Entries From a Non-Parallel English-Chinese Corpus", 1995, Proc., of the Third Workshop on Very Large Corpora, Boston, MA, pp. 173-183.
Gale, W. and Church, K., "A Program for Aligning Sentences in Bilingual Corpora," 1991, 29th Annual Meeting of the ACL, pp. 177-183.
Gale, W. and Church, K., "A Program for Aligning Sentences in Bilingual Corpora," 1993, Computational Linguistics, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
Germann et al., "Fast Decoding and Optimal Decoding for Machine Translation", 2001, Proc. of the 39th Annual of the ACL, Toulouse, France, pp. 228-235.
Germann, Ulrich: "Building a Statistical Machine Translation System from Scratch: How Much Bang for the Buck Can We Expect?" Proc. of the Data-Driven MT Workshop of ACL-01, Toulouse, France, 2001.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grefenstette, Gregory, "The World Wide Web as a Resource for Example-Based Machine Translation Tasks", 1999, Translating and the Computer 21, Proc. of the 21 st International Conf. on Translating and the Computer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Hatzivassiloglou, V. et al., "Unification-Based Glossing", 1995, Proc. of the International Joint Conference on Artificial Intelligence, pp. 1382-1389.
Huang et al., "Relabeling Syntax Trees to Improve Syntax-Based Machine Translation Quality," Jun. 4-9, 2006, in Proc. of the Human Language Technology Conference of the North American Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Klein et al., "Accurate Unlexicalized Parsing," Jul. 2003, in Proc. of the 41st Annual Meeting of the ACL, pp. 423-430.
Knight et al., "Integrating Knowledge Bases and Statistics in MT," 1994, Proc. of the Conference of the Association for Machine Translation in the Americas.
Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.
Knight, K. and Al-Onaizan, Y., "A Primer on Finite-State Software for Natural Language Processing", 1999 (available at http://www.isLedullicensed-sw/carmel).
Knight, K. and Al-Onaizan, Y., "Translation with Finite-State Devices," Proceedings of the 4th AMTA Conference, 1998.
Knight, K. and Chander, I., "Automated Postediting of Documents," 1994, Proc. of the 12th Conference on Artificial Intelligence, pp. 779-784.
Knight, K. and Graehl, J., "Machine Transliteration", 1997, Proc. of the ACL-97, Madrid, Spain, pp. 128-135.
Knight, K. and Hatzivassiloglou, V., "Two-Level, Many-Paths Generation," 1995, Proc. of the 33rd Annual Conference of the ACL, pp. 252-260.
Knight, K. and Luk, S., "Building a Large-Scale Knowledge Base for Machine Translation," 1994, Proc. of the 12th Conference on Artificial Intelligence, pp. 773-778.
Knight, K. and Marcu, D., "Statistics-Based Summarization—Step One: Sentence Compression," 2000, American Association for Artificial Intelligence Conference, pp. 703-710.
Knight, K. and Yamada, K., "A Computational Approach to Deciphering Unknown Scripts," 1999, Proc. of the ACL Workshop on Unsupervised Learning in Natural Language Processing.
Knight, Kevin, "A Statistical MT Tutorial Workbook," 1999, JHU Summer Workshop (available at http://www.isLedu/natural-language/mUwkbk.rtf).
Knight, Kevin, "Automating Knowledge Acquisition for Machine Translation," 1997, AI Magazine, vol. 18, No. 4.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, vol. 25, No. 4.
Knight, Kevin, "Integrating Knowledge Acquisition and Language Acquisition", May 1992, Journal of Applied Intelligence, vol. 1, No. 4.
Knight, Kevin, "Learning Word Meanings by Instruction," 1996, Proc. of the D National Conference on Artificial Intelligence, vol. 1, pp. 447-454.
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. i-105, Dec. 2003.
Koehn, P. and Knight, K., "ChunkMT: Statistical Machine Translation with Richer Linguistic Knowledge," Apr. 2002, Information Sciences Institution.

(56) References Cited

OTHER PUBLICATIONS

Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published in Proceedings of the 48th Annual Meeting of the Association for Computational Linguistics (ACL), Jul. 2010, pp. 612-621.
U.S. Appl. No. 11/454,212, filed Jun. 15, 2006.
Editorial FreeLancer Association, Guidelines for Fees, https://web.archive.org/web/20090604130631/http://www.the-efa.org/res/code_2.php, Jun. 4, 2009, retrieved Aug. 9, 2014.
Wasnak, L., "Beyond the Basics: How Much Should I Charge", https://web.archive.org/web/20070121231531/http://www.writersmarket.com/assets/pdf/How_Much_Should_I_Charge.pdf, Jan. 21, 2007, retrieved Aug. 19, 2014.
Summons to Attend Oral Proceedings mailed Sep. 18, 2014 in German Patent Application 10392450.7, filed Mar. 28, 2003.
Examination Report dated Jul. 22, 2013 in German Patent Application 112005002534.9, filed Oct. 12, 2005.
Office Action dated Feb. 2, 2015 in German Patent Application 10392450.7, filed Mar. 28, 2003.
Abney, Steven P. , "Parsing by Chunks," 1994, Bell Communications Research, pp. 1-18.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", In Proceedings of the Association for Machine Translation n The Americas, pp. 223-231, 2006, available at https://www.cs.umd.edu/~snover/pub/amta06/ter_amta.pdf.
Levenshtein, V.I., "Binary Codes Capable of Correcting Deletions, Insertions, and Reversals", 1966, Doklady Akademii Nauk SSSR, vol. 163, No. 4, pp. 707-710.
Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.
Gao et al., Proceedings of the Joint Fifth Workshop on Statistical Machine Translation and Metrics (MATR), 2010, pp. 1-10 and 121-126.
Callison-Burch et al., "Findings of the 2011 Workshop on Statistical Machine Translation," In Proceedings of the Sixth Workshop on Statistical Machine Translation, Edinburgh, Scotland, July. Association for Computational Linguistics, 2011, pp. 22-64.
Bohar et al., "A Grain of Salt for the WMT Manual Evaluation," In Proceedings of the Sixth Workshop on Statistical Machine Translation, Edinburgh, Scotland, Association for Computational Linguistics, Jul. 2011, pp. 1-11.
Przybocki et al., "GALE Machine Translation Metrology: Definition, Implementation, and Calculation," Chapter 5.4 in Handbook of Natural Language Processing and Machine Translation, Olive et al., eds., Springer, 2011, pp. 783-811.
Snover et al., "Fluency, Adequacy, or HTER? Exploring Different Human Judgements with a Tunable MT Metric", In Proceedings of the Fourth Workshop on Statistical Machine Translation at the 12th Meeting of the EACL, pp. 259-268, 2009.
Cormode et al., "The String Edit Distance Matching Problem with Moves," in ACM Transactions on Algorithms (TALG), 3(1):1-19, 2007.
Kanthak et al., "Novel Reordering Approaches in Phrase-Based Statistical Machine Translation," In Proceedings of the ACL Workshop on Building and Using Parallel Texts, Jun. 2005, pp. 167-174.
Allauzen et al., "OpenFst: A General and Efficient Weighted Finitestate Transducer Library," In Proceedings of the 12th International Conference on Implementation and Application of Automata (CIAA), 2007, pp. 11-23.
Denkowski et al., "Meteor 1.3: Automatic Metric for Reliable Optimization and Evaluation of Machine Translation Systems," In Proceedings of the EMNLP 2011 Workshop on Statistical Machine Translation, Jul. 2011, pp. 85-91.
Lavie et al., "The Meteor Metric for Automatic Evaluation of Machine Translation," Machine Translation, Sep. 23, 2009: 105-115.
Crammer et al., "On the Algorithmic Implementation of Multi-Class SVMs," In Journal of Machine Learning Research 2, Dec. 2001, pp. 265-292.
Dreyer, Markus et al., "HyTER: Meaning-Equivalent Semantics for Translation Evaluation," in Proceedings of the 2012 Conference of the North American Chapter of the Association of Computational Linguistics: Human Language Technologies. Jun. 3, 2012. 10 pages.
Przybocki, M.; Peterson, K.; Bronsart, S.; Official results of the NIST 2008 "Metrics for MAchine TRanslation" Challenge (MetricsMATR08), 7 pages. http://nist.gov/speech/tests/metricsmatr/2008/results/; https://www.nist.gov/multimodal-information-group/metrics-machine-translation-evaluation#history; https://www.nist.gov/itl/iad/mig/metrics-machine-translation-2010-evaluation.
Hildebrand et al., "Adaptation of the Translation Model for Statistical Machine Translation based on Information Retrieval," EAMT 2005 Conference Proceedings (May 2005), pp. 133-142 (10 pages).
Och et al., "The Alignment Template Approach to Statitstical Machine Translation," Journal Computational Linguistics, vol. 30, Issue 4, Dec. 2004, pp. 417-449 (39 pages).
Sethy et al, "Buidling Topic Specific Language Models from Webdata Using Competitive Models," INTERSPEECH 2005—Eurospeech, 9th European Conference on Speech Communication and Technology, Lisbon, Portugal, Sep. 4-8, 2005. 4 pages.
Potet et al., "Preliminary Experiments on Using Users; Post-Editions to Enhance a SMT System," Proceedings of the15th Conference of the European Association for Machine Translation, May 2011, pp. 161-168.
Ortiz-Martinez et al., "An Interactive Machine Translation System with Online Learning," Proceedings of the ACL-HLT 2011 System Demonstrations, Jun. 21, 2011, pp. 68-73.
Lopez-Salcedo et al., "Online Learning of Log-Linear Weights in Interactive Machine Translation," Communications in Computer and Information Science, vol. 328, 2012. 10 pages.
Blanchon et al., "A Web Service Enabling Gradable Post-edition of Pre-translations Produced by Existing Translation Tools: Practical Use to Provide High Quality Translation of an Online Encyclopedia," Jan. 2009. 8 pages.
Levenberg et al., "Stream-based Translation Models for Statistical Machine Translation," Human Language Technologies: The 2010 Annual Conference of the North American Chapter of the ACL, Jun. 2010, pp. 394-402.
Lagarda et al., "Statistical Post-Editing of a Rule-Based Machine Translation System," Proceedings of NAACL HLT 2009, Jun. 2009, pp. 217-220.
Ehara, "Rule Based Machine Translation Combined with Statistical Post Editor for Japanese to English Patent Translation," MT Summit XI, 2007, pp. 13-18.
Bechara et al., "Statistical Post-Editing for a Statistical MT System," Proceedings of the 13th Machine Translation Summit, 2011, pp. 308-315.
Dobrinkat, "Domain Adaptation in Statistical Machine Translation Systems via User Feedback," Abstract of Master's Thesis, Helsinki University of Technology, Nov. 25, 2008, 103 pages.
Business Wire, "Language Weaver Introduces User-Managed Customization Tool," Oct. 25, 2005, 3 pages. http://www.businesswire.com/news/home/20051025005443/en/Language-Weaver-Introduces-User-Managed-Customization-Tool-Newest.

(56) References Cited

OTHER PUBLICATIONS

Winiwarter, "Learning Transfer Rules for Machine Translation from Parallel Corpora," Journal of Digital Information Management, vol. 6, No. 4, Aug. 1, 2008, pp. 285-293 (9 pages).
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.
Patent Cooperation Treaty International Preliminary Report on Patentability and the Written Opinion, International application No. PCT/US2008/004296, dated Oct. 6, 2009, 5 pgs.
Document, Wikipedia.com, web.archive.org (Feb. 22, 2004) /http://en.wikipedia.org/wikii/Document>, Feb. 22, 2004.
Identifying, Dictionary.com, wayback.archive.org (Feb. 28, 2007) </http://dictionary.reference.com/browse/identifying>, accessed Oct. 27, 2011 <http://web.archive.org/web/20070228150533/http://dictionary.reference.com/browse/identifying>.
Koehn, P. et al, "Statistical Phrase-Based Translation," Proceedings of HLT-NAACL 2003 Main Papers , pp. 48-54 Edmonton, May-Jun. 2003.
Abney, S.P., "Stochastic Attribute Value Grammars", Association for Computational Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://aclidc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.
Wang, W., et al. "Capitalizing Machine Translation" In HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Yasuda et al., "Automatic Machine Translation Selection Scheme to Output the Best Result," Proc. of LREC, 2002, pp. 525-528.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in Contrast—A Context-Based Machine System", 1995, Translation Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Graciet C., Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, "Training Tree Transducers," In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action dated Jun. 7, 2004 in Canadian Patent Application 2408819, filed May 11, 2001.
First Office Action dated Jun. 14, 2007 in Canadian Patent Application 2475857, filed Mar. 11, 2003.
Office Action dated Mar. 26, 2012 in German Patent Application 10392450.7, filed Mar. 28, 2003.
First Office Action dated Nov. 5, 2008 in Canadian Patent Application 2408398, filed Mar. 27, 2003.
Second Office Action dated Sep. 25, 2009 in Canadian Patent Application 2408398, filed Mar. 27, 2003.
First Office Action dated Mar. 1, 2005 in European Patent Application No. 03716920.8, filed Mar. 27, 2003.
Second Office Action dated Nov. 9, 2006 in European Patent Application No. 03716920.8, filed Mar. 27, 2003.
Third Office Action dated Apr. 30, 2008 in European Patent Application No. 03716920.8, filed Mar. 27, 2003.
Office Action dated Oct. 25, 2011 in Japanese Patent Application 2007-536911 filed Oct. 12, 2005.
Office Action dated Jul. 24, 2012 in Japanese Patent Application 2007-536911 filed Oct. 12, 2005.
Final Office Action dated Apr. 9, 2013 in Japanese Patent Application 2007-536911 filed Oct. 12, 2005.
Office Action dated May 13, 2005 in Chinese Patent Application 1812317.1, filed May 11, 2001.
Office Action dated Apr. 21, 2006 in Chinese Patent Application 1812317.1, filed May 11, 2001.

(56) References Cited

OTHER PUBLICATIONS

Office Action dated Jul. 19, 2006 in Japanese Patent Application 2003-577155, filed Mar. 11, 2003.
Office Action dated Mar. 1, 2007 in Chinese Patent Application 3805749.2, filed Mar. 11, 2003.
Office Action dated Feb. 27, 2007 in Japanese Patent Application 2002-590018, filed May 13, 2002.
Office Action dated Jan. 26, 2007 in Chinese Patent Application 3807018.9, filed Mar. 27, 2003.
Office Action dated Dec. 7, 2005 in Indian Patent Application 2283/DELNP/2004, filed Mar. 11, 2003.
Office Action dated Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action dated Aug. 29, 2006 in Japanese Patent Application 2003-581064, filed Mar. 27, 2003.
Office Action dated Jan. 26, 2007 in Chinese Patent Application 3807027.8, filed Mar. 28, 2003.
Office Action dated Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Huang et al., "Statistical syntax-directed translation with extended domain of locality," Jun. 9, 2006, In Proceedings of AMTA, pp. 1-8.
Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.
Notice of Allowance dated Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.
Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.
Kupiec, Julian, "An Algorithm for Finding Noun Phrase Correspondences in Bilingual Corpora," In Proceedings of the 31st Annual Meeting of the ACL, 1993, pp. 17-22.
Kurohashi, S. and Nagao, M., "Automatic Detection of Discourse Structure by Checking Surface Information in Sentences,"1994, Proc. of COL-LING '94, vol. 2, pp. 1123-1127.
Langkilde, I. and Knight, K., "Generation that Exploits Corpus-Based Statistical Knowledge," 1998, Proc. of the COLING-ACL, pp. 704-710.
Langkilde, I. and Knight, K., "The Practical Value of N-Grams in Generation," 1998, Proc. of the 9th International Natural Language Generation Workshop, pp. 248-255.
Langkilde, Irene, "Forest-Based Statistical Sentence Generation," 2000, Proc. of the 1st Conference on North American chapter of the ACL, Seattle, WA, pp. 170-177.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde-Geary, Irene, "An Empirical Verification of Coverage and Correctness for a General-Purpose Sentence Generator," 1998, Proc. 2nd Int'l Natural Language Generation Conference.
Lee, Yue-Shi, "Neural Network Approach to Adaptive Learning: with an Application to Chinese Homophone Disambiguation," IEEE 2001 pp. 1521-1526. Jul. 2001.
Lita, L. et al., "tRuEcasIng," 2003 Proceedings of the 41st Annual Meeting of the Assoc. for Computational Linguistics (In Hinrichs, E. and Roth, D.—editors), pp. 152-159. Jul. 2003.
Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations of Statistical Natural Language Processing," 2000, The MIT Press, Cambridge, MA [Front Matter].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A Full-Text Retrieval System with a Dynamic Abstract Generation Function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

(56) References Cited

OTHER PUBLICATIONS

Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining Computational Complexity from Characteristic 'Phase Transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Niessen, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memorization with Applications to Context-Free Parsing", Computational Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och et al., "Discriminative Training and Maximum Entropy Models for Statistical Machine Translation." Proceedings of the 40th Annual Meeting on Association for Computational Linguistics. Association for Computational Linguistics (ACL), Philadelphia, Jul. 2002; pp. 295-302.
Och, F. and Ney, H., "A Systematic Comparison of Various Statistical Alignment Models," Computational Linguistics, 2003, 29:1, 19-51.
Papineni et al., "BLEU: a Method for Automatic Evaluation of Machine Translation," IBM Research Report, RC22176 (WQ102-022), 2001, 12 pages.
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.," Hybrid Language Processing in the Spoken Language Translator," IEEE 1997, pp. 107-110.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.

(56) References Cited

OTHER PUBLICATIONS

"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API _ API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base,"Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
"Office Action," German Application No. 112005002534.9, dated Feb. 7, 2018, 6 pages (9 pages including translation).

* cited by examiner

300

300

600

| Desiderata | Auto. | Manu. | HyTER |
|---|---|---|---|
| Metric is intuitive | N | Y | Y |
| Metric is computed automatically | Y | N | Y |
| Metric is stable and reproducible from one evaluation to another | Y | N | Y |
| Metric works equally well when comparing human and automatic outputs and when comparing rule-based, statistical-based, and hybrid engines | N | Y | Y |
| System developers can tune to the metric | Y | N | Y |
| Metric helps developers identify deficiencies of MT engines | N | N | Y |

| | Arabic-English | | | Chinese-English | | |
|---|---|---|---|---|---|---|
| Metric | Human mean | Machine mean | m/h | Human mean | Machine mean | m/h |
| [100-0]-BLEU, 1 ref | 59.90 | 69.14 | 1.15 | 71.86 | 84.34 | 1.17 |
| [100-0]-BLEU, 3 refs | 41.49 | 57.44 | 1.38 | 54.25 | 75.22 | 1.39 |
| [100-0]-Meteor, 1 ref | 60.13 | 65.70 | 1.09 | 66.81 | 73.66 | 1.10 |
| [100-0]-Meteor, 3 refs | 55.98 | 62.91 | 1.12 | 62.95 | 70.68 | 1.12 |
| [100-0]-TERp, 1 ref | 35.87 | 46.48 | 1.30 | 53.58 | 71.70 | 1.34 |
| [100-0]-TERp, 3 refs | 27.08 | 39.52 | 1.46 | 41.79 | 60.61 | 1.45 |
| HyTER U | 18.42 | 34.94 | 1.90 | 27.98 | 52.08 | 1.86 |
| HyTER SPU | 17.85 | 34.39 | 1.93 | 27.57 | 51.73 | 1.88 |
| [100-0]-Likert | 5.26 | 50.37 | 9.57 | 4.35 | 48.37 | 11.12 |

| Lang. | 0 | 0+ | 1 | 1+ | 2 | 2+ | 3 | 3+ |
|---|---|---|---|---|---|---|---|---|
| Chi. | 0.0 | 8.2 | 40.8 | 65.3 | 59.2 | 10.2 | 4.1 | 0.0 |
| Rus. | 0.0 | 2.8 | 12.7 | 42.3 | 60.6 | 46.5 | 25.4 | 5.6 |
| Spa. | 0.0 | 1.3 | 33.3 | 66.7 | 88.0 | 24.0 | 4.0 | 0.0 |
| All | 0.0 | 3.6 | 27.7 | 57.4 | 70.8 | 28.7 | 11.8 | 2.1 |

| Level | Measure | Baseline | HyTER-enabled |
|---|---|---|---|
| All | Accuracy | 72.31 | 90.77 |
| 2 or better | Precision | 85.62 | 82.11 |
| | Recall | 84.93 | 98.63 |
| | $F_1$ | 85.27 | 89.62 |

FIG. 6D

METHOD AND SYSTEM FOR AUTOMATIC MANAGEMENT OF REPUTATION OF TRANSLATORS

CROSS REFERENCE TO RELATED APPLICATIONS

This application is a continuation of and claims the benefit and priority of U.S. patent application Ser. No. 13/481,561, filed on May 25, 2012, titled "METHOD AND SYSTEM FOR AUTOMATIC MANAGEMENT OF REPUTATION OF TRANSLATORS", now granted as U.S. Pat. No. 10,261,994 issued on Apr. 16, 2019, which is hereby incorporated by reference herein in its entirety including all references and appendices cited therein.

STATEMENT REGARDING FEDERALLY SPONSORED RESEARCH OR DEVELOPMENT

The U.S. Government may have certain rights in this invention pursuant to DARPA contract HR0011-11-C-0150 and TSWG contract N41756-08-C-3020.

FIELD OF THE INVENTION

The present invention relates generally to managing an electronic marketplace for translation services, and more specifically, to a method and system for determining an initial reputation of a translator using testing and adjusting the reputation based on service factors.

BACKGROUND

Translation of written materials from one language into another are required more often and are becoming more important as information moves globally and trade moves worldwide. Translation is often expensive and subject to high variability depending on the translator, whether human or machine.

Translations are difficult to evaluate since each sentence may be translated in more than one way.

Marketplaces are used to drive down costs for consumers, but typically require a level of trust by a user. Reputation of a seller may be communicated in any number of ways, including word of mouth and online reviews, and may help instill trust in a buyer for a seller.

SUMMARY OF THE INVENTION

According to exemplary embodiments, the present invention provides a method that includes receiving a result word set in a target language representing a translation of a test word set in a source language. When the result word set is not in a set of acceptable translations, the method includes measuring a minimum number of edits to transform the result word set into a transform word set. The transform word set is one of the set of acceptable translations.

A system is provided that includes a receiver to receive a result word set in a target language representing a translation of a test word set in a source language. The system also includes a counter to measure a minimum number of edits to transform the result word set into a transform word set when the result word set is not in a set of acceptable translations. The transform word set is one of the set of acceptable translations.

A method is provided that includes determining a translation ability of a human translator based on a test result. The method also includes adjusting the translation ability of the human translator based on historical data of translations performed by the human translator.

These and other advantages of the present invention will be apparent when reference is made to the accompanying drawings and the following description.

BRIEF DESCRIPTION OF THE DRAWINGS

FIGS. 6A to 6D are tables illustrating various aspects of the exemplary method;

DETAILED DESCRIPTION OF EXEMPLARY EMBODIMENTS

Figure 1A:
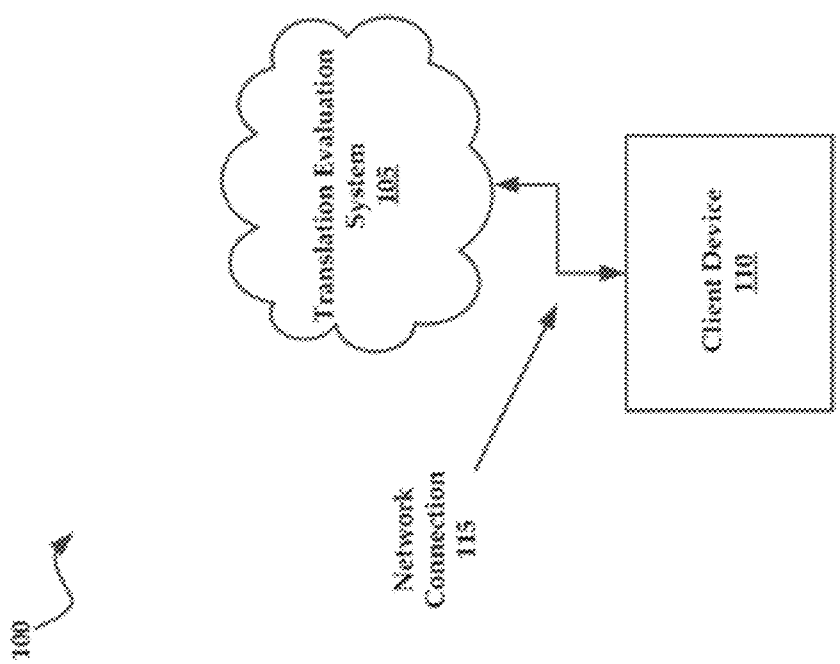
FIG. 1A illustrates an exemplary system for practicing aspects of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to translations services. More specifically, the present invention provides a system and method for evaluating the translation ability of a human or machine translator, and for ongoing reputation management of a human translator.

FIG. 1A illustrates an exemplary system 100 for practicing aspects of the present technology. The system 100 may include a translation evaluation system 105 that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the translation evaluation system 105 may include a distributed group of computing devices such as web servers that do not share computing resources or workload. Additionally, the translation evaluation system 105 may include a single computing system that has been provisioned with a plurality of programs that each produces instances of event data.

Users offering translation services and/or users requiring translation services may interact with the translation evaluation system 105 via a client device 110, such as an end user computing system or a graphical user interface. The translation evaluation system 105 may communicatively couple with the client device 110 via a network connection 115. The network connection 115 may include any one of a number of private and public communications mediums such as the Internet.

In some embodiments, the client device 110 may communicate with the translation evaluation system 105 using a secure application programming interface or API. An API allows various types of programs to communicate with one another in a language (e.g., code) dependent or language agnostic manner.

Figure 1B:
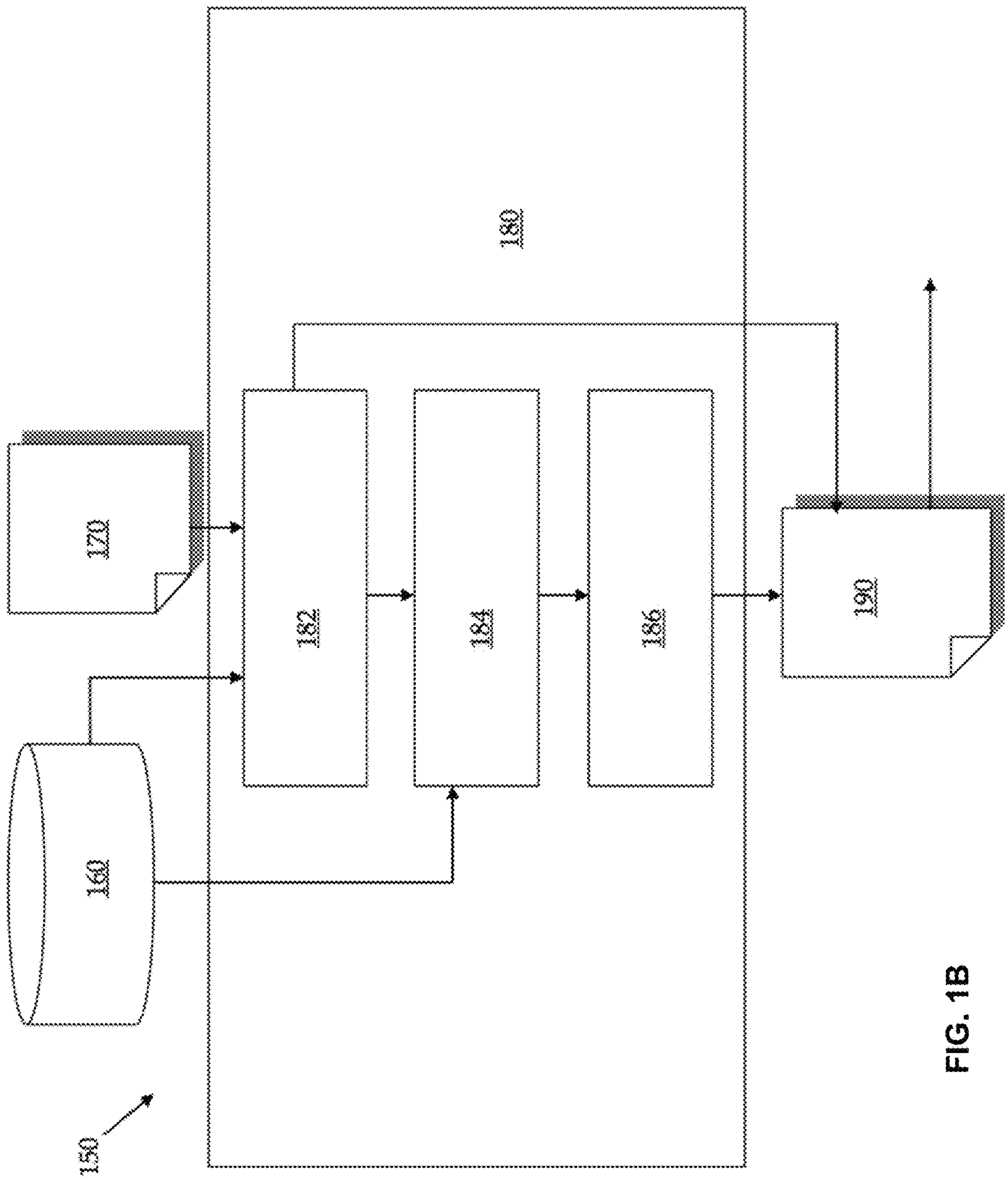
FIG. 1B is a schematic diagram illustrating an exemplary process flow through an exemplary system.

FIG. 1B is a schematic diagram illustrating an exemplary process flow through translation evaluation system 150. Translation evaluation system 150 is used to evaluate translation 170, which is a translation of a source language test word set by a human translator or a machine translator. Translation 170 is input into comparator 182 of evaluator 180. Comparator 182 accesses acceptable translation database 160, which includes a set of acceptable translations of the source language test word set, and determines if there is an identity relationship between translation 170 and one of the acceptable translations. If there is an identity relationship, then score 190 is output as a perfect score, which may be a "0". Otherwise, the flow in the system proceeds to transformer 184, which also accesses acceptable translation database 160. Acceptable translation database 160 may be populated by human translators or machine translators, or some combination of the two. The techniques described herein may be used to populate acceptable translation database 160 based on outputs of multiple translators. Transformer 184 determines the minimum number of edits required to change translation 170 into one of the acceptable translations. An edit may be a substitution, a deletion, an insertion, and/or a move of a word in translation 170. After the minimum number of edits is determined, the flow proceeds to counter 186, which counts the minimum number of edits and other translation characteristics such as n-gram overlap between the two translations. The number of edits need to transform translation 170 into one of the acceptable translations is then output from evaluator 180 as score 190.

During the last decade, automatic evaluation metrics have helped researchers accelerate the pace at which they improve machine translation (MT) systems. Human-assisted metrics have enabled and supported large-scale U.S. government sponsored programs. However, these metrics have started to show signs of wear and tear.

Automatic metrics are often criticized for providing non-intuitive scores—for example, few researchers can explain to casual users what a BLEU score of 27.9 means. And researchers have grown increasingly concerned that automatic metrics have a strong bias towards preferring statistical translation outputs; the NIST (2008, 2010), MATR (Gao et al., 2010) and WMT (Callison-Burch et al., 2011) evaluations held during the last five years have provided ample evidence that automatic metrics yield results that are inconsistent with human evaluations when comparing statistical, rule-based, and human outputs.

In contrast, human-informed metrics have other deficiencies: they have large variance across human judges (Bojar et al., 2011) and produce unstable results from one evaluation to another (Przybocki et al., 2011). Because evaluation scores are not computed automatically, systems developers cannot automatically tune to human-based metrics.

FIG. 6A is table 600 illustrating properties of evaluation metrics including an automatic metric, a human metric, and a proposed metric. FIG. 6A summarizes the dimensions along which evaluation metrics should do well and the strengths and weaknesses of the automatic and human-informed metrics proposed to date. One goal is to develop metrics that do well along all these dimensions. The failures of current automatic metrics are not algorithmic: BLEU, Meteor, TER (Translation Edit Rate), and other metrics efficiently and correctly compute informative distance functions between a translation and one or more human references. These metrics fail simply because they have access to sets of human references that are too small. Access to the set of all correct translations of a given sentence would enable measurement of the minimum distance between a translation and the set. When a translation is perfect, it can be found in the set, so it requires no editing to produce a perfect translation. Therefore, its score should be zero. If the translation has errors, the minimum number of edits (substitutions, deletions, insertions, moves) needed to rewrite the translation into the "closest" reference in the set can be efficiently computed. Current automatic evaluation metrics do not assign their best scores to most perfect translations because the set of references they use is too small; their scores can therefore be perceived as less intuitive.

Following these considerations, an annotation tool is provided that enables one to efficiently create an exponential number of correct translations for a given sentence, and present a new evaluation metric, HyTER, which efficiently exploits these massive reference networks. The following description describes an annotation environment, process, and meaning-equivalent representations. A new metric, the HyTER metric, is presented. This new metric provides better support than current metrics for machine translation evaluation and human translation proficiency assessment. A web-based annotation tool can be used to create a representation encoding an exponential number of meaning equivalents for a given sentence. The meaning equivalents are constructed in a bottom-up fashion by typing translation equivalents for larger and larger phrases. For example, when building the meaning equivalents for the Spanish phrase "el primer ministro italiano Silvio Berlusconi", the annotator may first type in the meaning equivalents for "primer ministro"—prime-minister; PM; prime minister; head of government; premier; etc.; "italiano"—Italiani; and "Silvio Berlusconi"—Silvio Berlusconi; Berlusconi. The tool creates a card that stores all the alternative meanings for a phrase as a determined finite-state acceptor (FSA) and gives it a name in the target language that is representative of the underlying meaning-equivalent set: [PRIME-MINISTER], [ITALIAN], and [SILVIO-BERLUSCONI]. Each base card can be thought of as expressing a semantic concept. A combination of existing cards and additional words can be subsequently used to create larger meaning equivalents that cover increasingly larger source sentence segments. For example, to create the meaning equivalents for "el primer ministro italiano" one can drag-and-drop existing cards or type in new words: the [ITALIAN] [PRIME-MINISTER]; the [PRIME-MINISTER] of Italy; to create the meaning equivalents for “el primer ministro italiano Silvio Berlusconi”, one can drag-and-drop and type: [SILVIO-BERLUSCONI], [THE-ITALIAN-PRIME-MINISTER]; [THE-ITALIAN-PRIME-MINISTER], [SILVIO-BERLUSCONI]; [THE-ITALIAN-PRIME-MINISTER] [SILVIO-BERLUSCONI]. All meaning equivalents associated with a given card are expanded and used when that card is re-used to create larger meaning equivalent sets.

Figure 8:
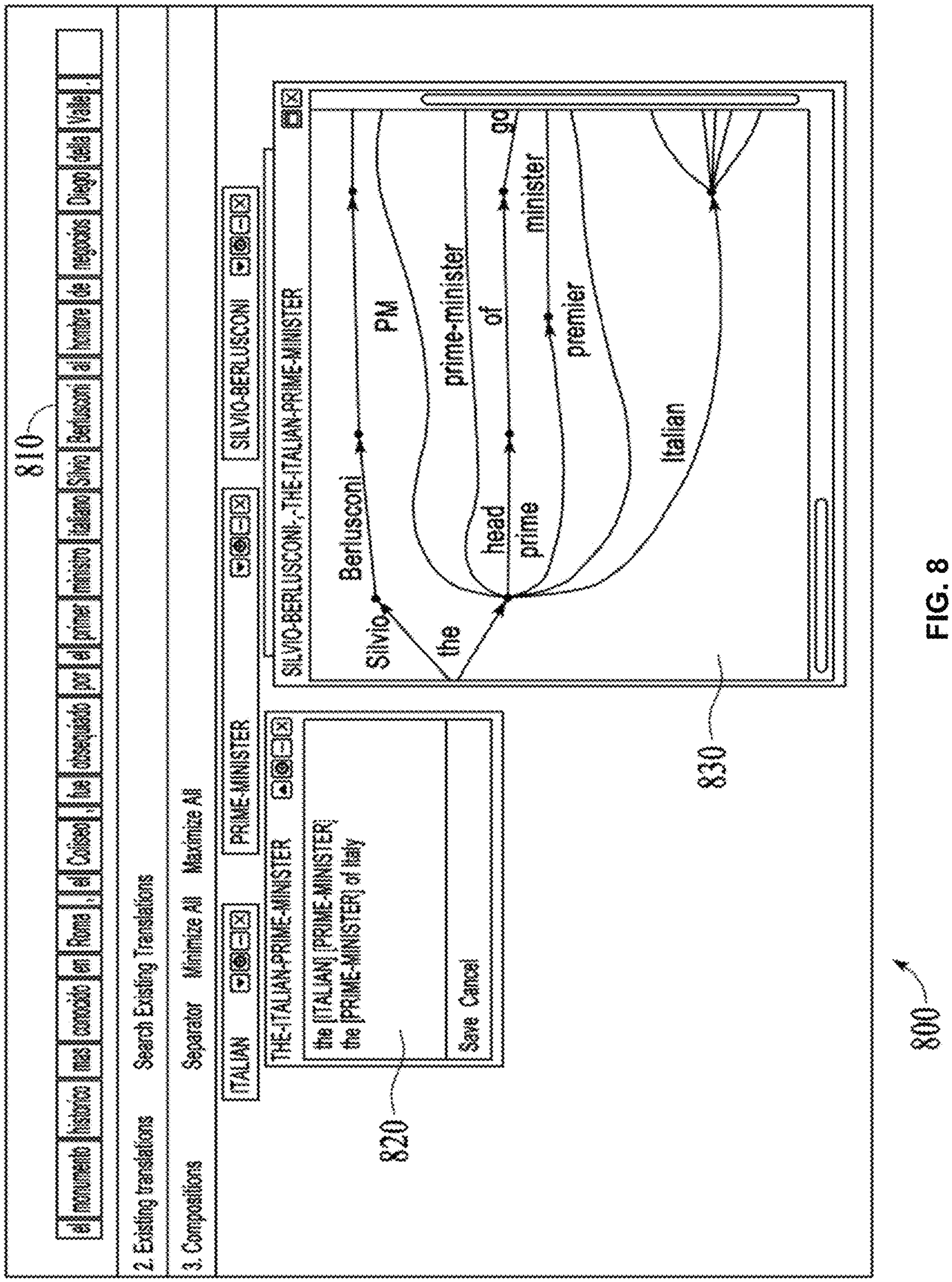
FIG. 8 illustrates a graphical user interface for building large networks of meaning equivalents.

FIG. 8 illustrates graphical user interface (GUI) 800 for building large networks of meaning equivalents. Source sentence 810 is displayed within GUI 800, and includes several strings of words. One string of words in source sentence 810 has been translated in two different ways. The two acceptable translations of the string are displayed in acceptable translation area 820. All possible acceptable translations are produced by the interface software by combining hierarchically the elements of several possible acceptable translations for sub-strings of the source string of source sentence 810. The resulting lattice 830 of acceptable sub-string translations illustrates all acceptable alternative translations that correspond to a given text segment.

The annotation tool supports, but does not enforce, re-use of annotations created by other annotators. The resulting meaning equivalents are stored as recursive transition networks (RTNs), where each card is a subnetwork; if needed, these non-cyclic RTNs can be automatically expanded into finite-state acceptors (FSAs). Using the annotation tool, meaning-equivalent annotations for 102 Arabic and 102 Chinese sentences have been created—a subset of the “progress set” used in the 2010 Open MT NIST evaluation (the average sentence length was 24 words). For each sentence, four human reference translations produced by LDC and five MT system outputs were accessed, which were selected by NIST to cover a variety of system architectures (statistical, rule-based, hybrid) and performances. For each MT output, sentence-level HTER scores (Snover et al., 2006) were accessed, which were produced by experienced LDC annotators.

Three annotation protocols may be used: 1) Ara-A2E and Chi-C2E: Foreign language natives built English networks starting from foreign language sentences; 2) Eng-A2E and Eng-C2E: English natives built English networks starting from “the best translation” of a foreign language sentence, as identified by NIST; and 3) Eng*-A2E and Eng*-C2E: English natives built English networks starting from “the best translation”. Additional, independently produced human translations may be used and/or accessed to boost creativity.

Each protocol may be implemented independently by at least three annotators. In general, annotators may need to be fluent in the target language, familiar with the annotation tool provided, and careful not to generate incorrect paths, but they may not need to be linguists.

Multiple annotations may be exploited by merging annotations produced by various annotators, using procedures such as those described below. For each sentence, all networks that were created by the different annotators are combined. Two different combination methods are evaluated, each of which combines networks N1 and N2 of two annotators (see, for example, FIG. 2). First, the standard union U(N1;N2) operation combines N1 and N2 on the whole-network level. When traversing U(N1;N2), one can follow a path that comes from either N1 or N2. Second, source-phrase-level union SPU(N1;N2) may be used. As an alternative, SPU is a more fine-grained union which operates on sub-sentence segments. Each annotator explicitly aligns each of the various subnetworks for a given sentence to a source span of that sentence. Now for each pair of subnetworks (S1; S2) from N1 and N2, their union is built if they are compatible. Two subnetworks S1; S2 are defined to be compatible if they are aligned to the same source span and have at least one path in common.

Figure 2:
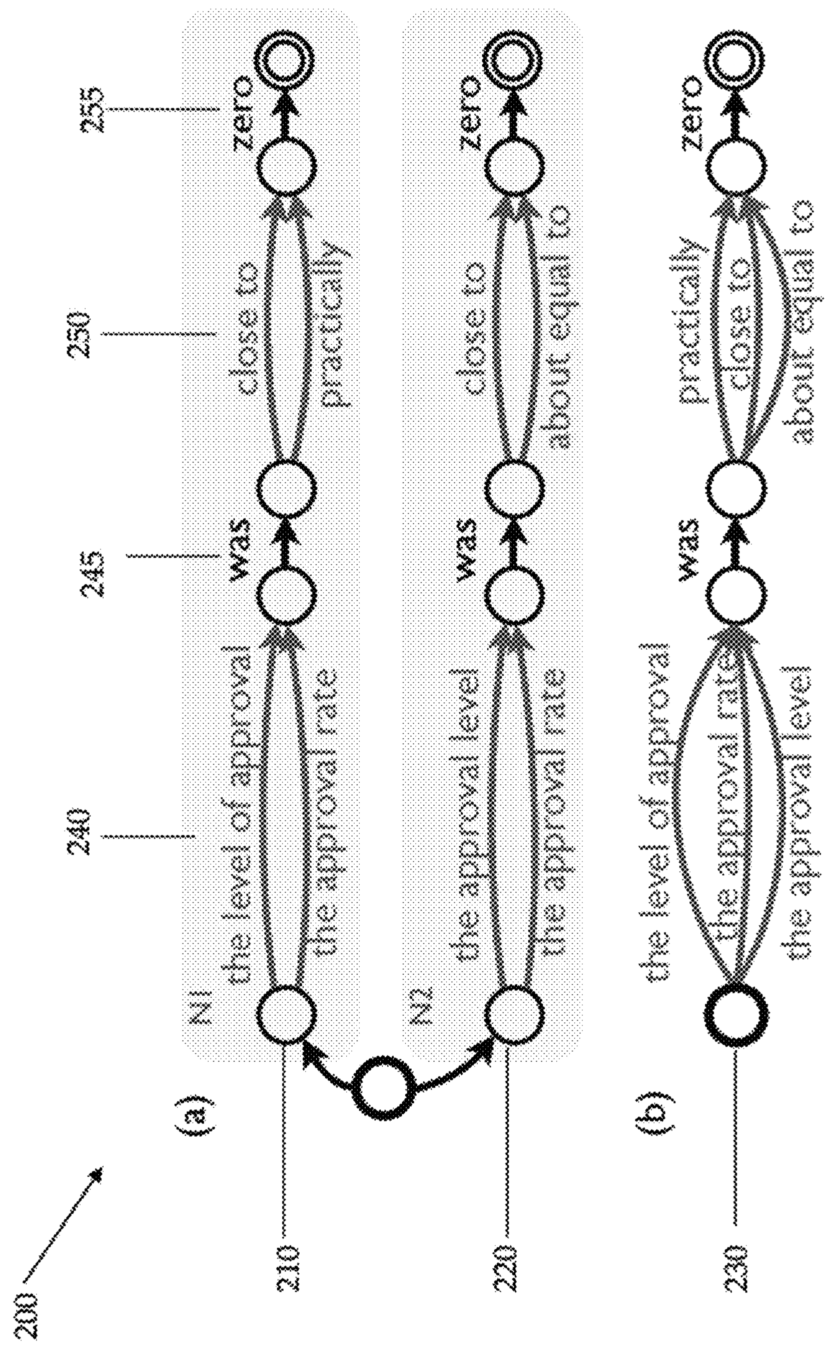
FIG. 2 is a schematic diagram illustrating an exemplary method for constructing a set of acceptable translations.

FIG. 2 is a schematic diagram illustrating exemplary method 200 for constructing a set of acceptable translations. First deconstructed translation set 210 represents a deconstructed translation of a source word set, in this case a sentence, made by a first translator. First deconstructed translation set 210 is a sentence divided into four parts, subject clause 240, verb 245, adverbial clause 250, and object 255. Subject clause 240 is translated by the first translator in one of two ways, either “the level of approval” or “the approval rate”. Likewise, adverbial clause 250 is translated by the first translator in one of two ways, either “close to” or “practically”. Both verb 245 and object 255 are translated by the first translator in only one way, namely “was” and “zero”, respectively. First deconstructed translation set 210 generates four (due to the multiplication of the different possibilities, namely two times one times two times one) acceptable translations.

A second translator translates the same source word set to arrive at second deconstructed translation set 220, which includes overlapping but not identical translations, and also generates four acceptable translations. One of the translations generated by second deconstructed translation set 220 is identical to one of the translations generated by first deconstructed translation set 210, namely “the approval rate was close to zero”. Therefore, the union of the outputs of first deconstructed translation set 210 and second deconstructed translation set 220 yields seven acceptable translations. This is one possible method of populating a set of acceptable translations.

However, a larger, more complete set of acceptable translations may result from combining elements of subject clause 240, verb 245, adverbial clause 250, and object 255 for both first deconstructed translation set 210 and second deconstructed translation set 220 to yield third deconstructed translation set 230. Third deconstructed translation set 230 generates nine (due to the multiplication of the different possibilities, namely three times one times three times one) acceptable translations. Third deconstructed translation set 230 generates two additional translations that do not result from the union of the outputs of first deconstructed translation set 210 and second deconstructed translation set 220 yields. In particular, third deconstructed translation set 230 generates additional translation “the approval level was practically zero” and “the level of approval was about equal to zero”. In this manner, a large set of acceptable translations can be generated from the output of two translators.

The purpose of source-phrase-level union (SPU) is to create new paths by mixing paths from N1 and N2. In FIG. 2, for example, the path “the approval level was practically zero” is contained in the SPU, but not in the standard union. SPUs are built using a dynamic programming algorithm that builds subnetworks bottom-up, thereby building unions of intermediate results. Two larger subnetworks can be compatible only if their recursive smaller subnetworks are compatible. Each SPU contains at least all paths from the standard union.

Some empirical findings may characterize the annotation process and the created networks. When comparing the productivity of the three annotation protocols in terms of the number of reference translations that they enable, the target language natives that have access to multiple human references produce the largest networks. The median number of paths produced by one annotator under the three protocols varies from 7.7 times 10 to the $5^{th}$ power paths for Ara-A2E, to 1.4 times 10 to the $8^{th}$ power paths for Eng-A2E, to 5.9 times 10 to the $8^{th}$ power paths for Eng*-A2E. In Chinese, the medians vary from 1.0 times 10 to the $5^{th}$ power for Chi-C2E, to 1.7 times 10 to the $8^{th}$power for Eng-C2E, to 7.8 times 10 to the $9^{th}$ power for Eng*-C2E.

Referring now collectively to FIGS. 3A-3D, a metric for measuring translation quality with large reference networks of meaning equivalents is provided, and is entitled HyTER (Hybrid Translation Edit Rate). HyTER is an automatically computed version of HTER (Snover et al., 2006). HyTER computes the minimum number of edits between a translation x (hypothesis x 310 of FIG. 3A) and an exponentially sized reference set Y, which may be encoded as a Recursive Transition Network (Reference RTN Y 340 of FIG. 3A). Perfect translations may have a HyTER score of 0.

Figure 3A:
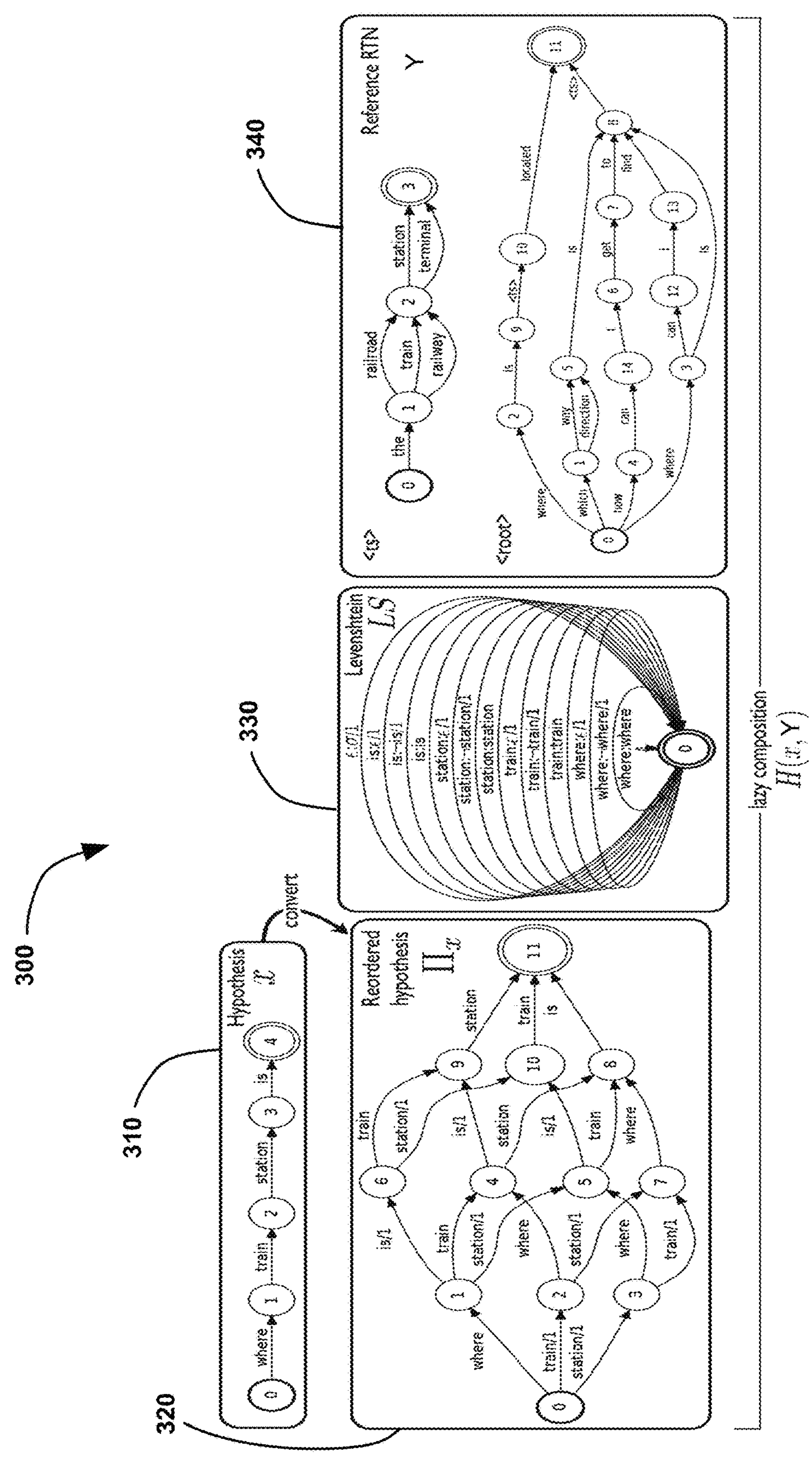
FIG. 3A is a schematic diagram illustrating an exemplary method for developing a search space.
Figure 3B:
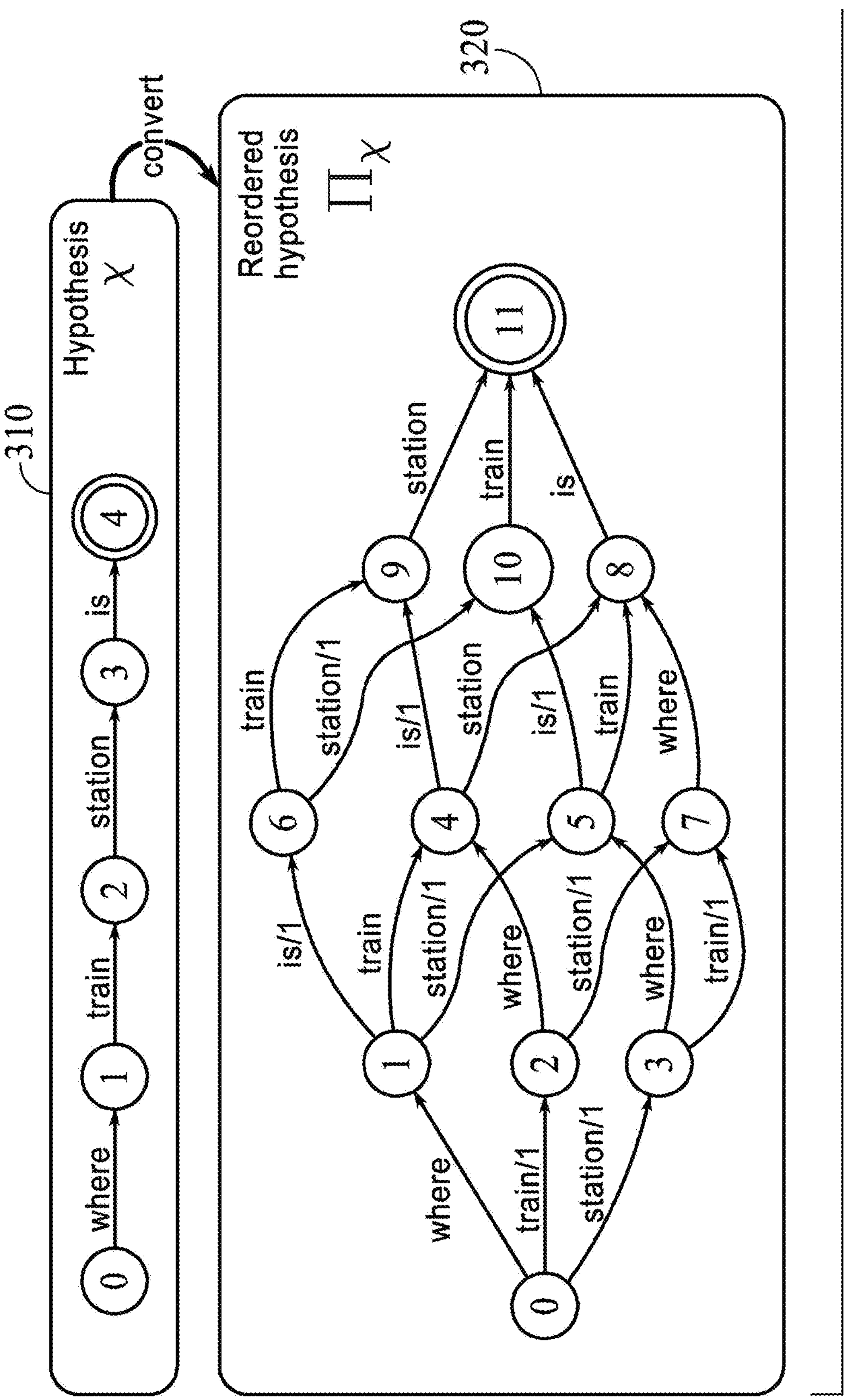
FIGS. 3B-3D collectively illustrate three partial views that form the single complete view of FIG. 3A.
Figure 3C:
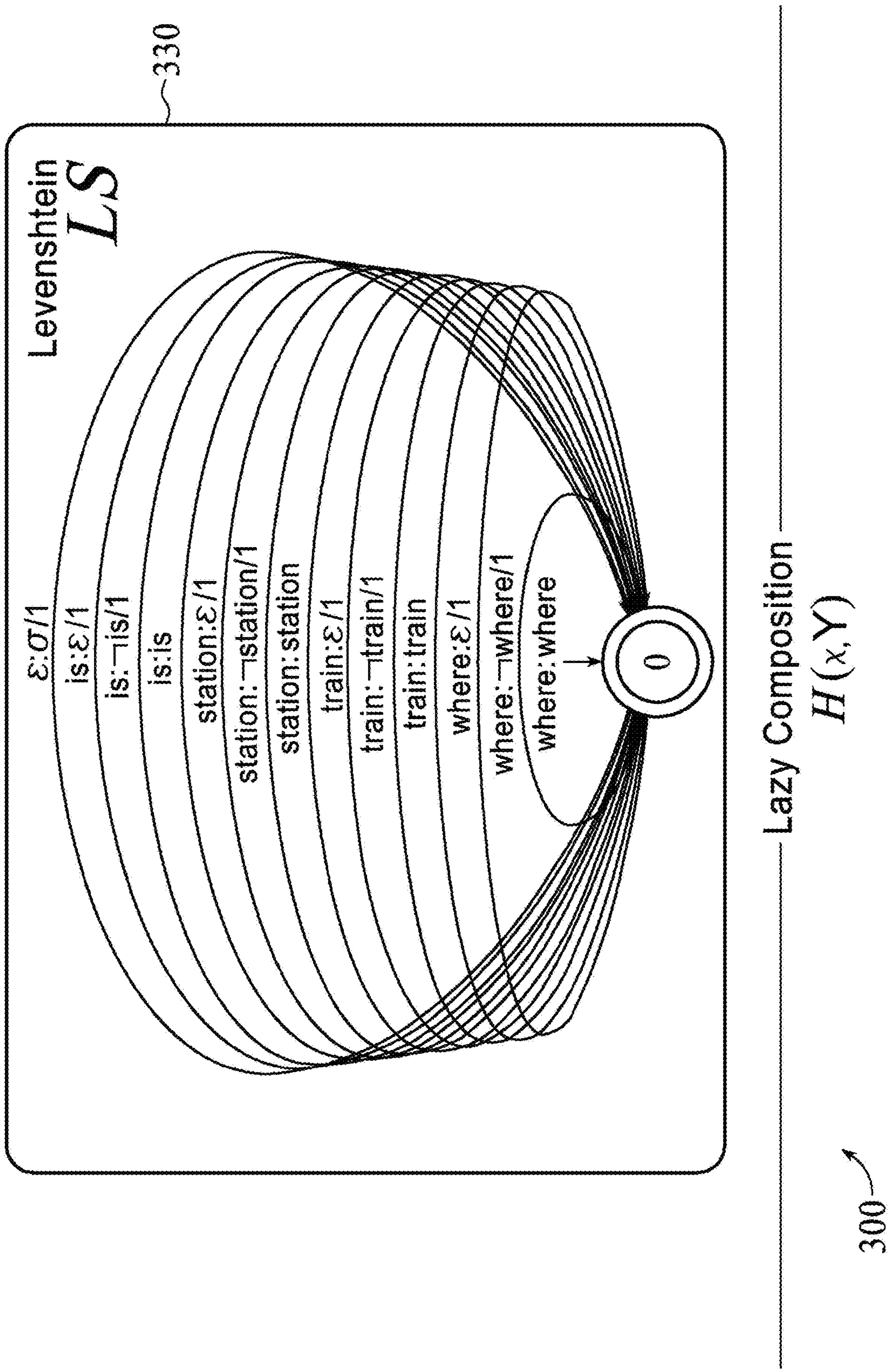
Figure 3D:
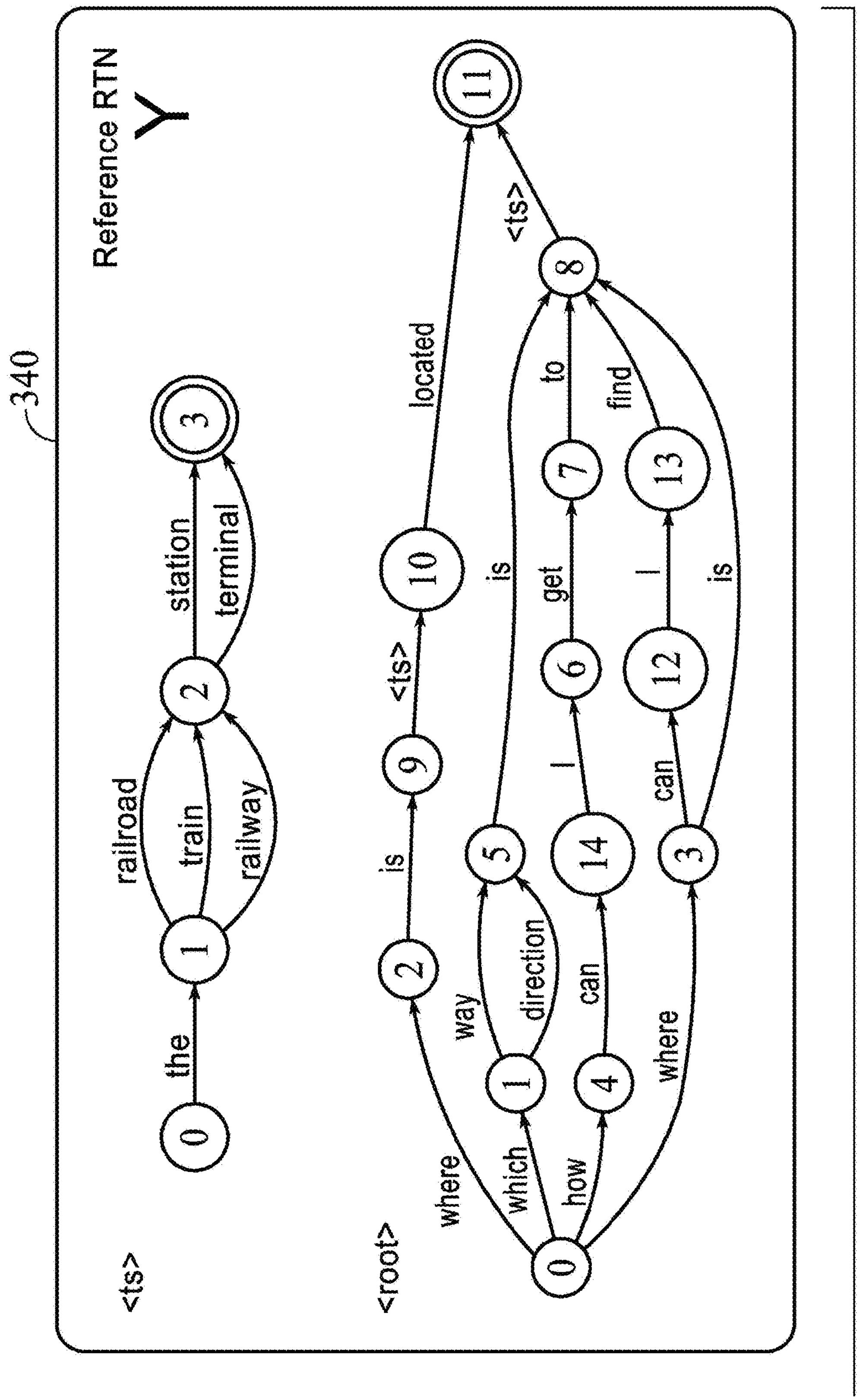

FIG. 3A is a schematic diagram illustrating a model 300 for developing a search space. The model 300 includes a hypothesis-x 310, a reordered hypothesis Πx 320, a Levenshtein transducer 330, and a reference RTN Y 340. The model 300 illustrates a lazy composition H(x;Y) of the reordered hypothesis Πx 320, the Levenshtein transducer 330, and the reference RTN Y 340. An unnormalized HyTER score may be defined and normalized by the number of words in the found closest path. This minimization problem may be treated as graph-based search. The search space over which we minimize is implicitly represented as the Recursive Transition Network H, where gamma-x is encoded as a weighted FSA that represents the set of permutations of x (e.g., "Reordered hypotheses Πx 320" in FIG. 3A that represents permutations of Hypothesis x 310) with their associated distance costs, and LS is the one-state Levenshtein transducer 330 whose output weight for a string pair (x,y) is the Levenshtein distance between x and y, and symbol H(x,Y) denotes a lazy composition of the Reordered hypotheses Πx 320, the Levenshtein transducer 330, and the reference RTN Y 340, as illustrated in FIG. 3A. The model 300 is depicted in FIGS. 3A-3D, which is a schematic diagram illustrating an exemplary method for developing a search space H(x,Y).

An FSA gamma-x-allows permutations (Πx 320) according to certain constraints. Allowing all permutations of the hypothesis x 310 would increase the search space to factorial size and make inference NP-complete (Cormode and Muthukrishnan, 2007). Local-window constraints (see, e.g., Kanthak et al. (2005)) are used, where words may move within a fixed window of size k. These constraints are of size O(n) with a constant factor k, where n is the length of the translation hypothesis x 310. For efficiency, lazy evaluation may be used when defining the search space H(x;Y). Gamma-x may never be explicitly composed, and parts of the composition that the inference algorithm does not explore may not be constructed, saving computation time and memory. Permutation paths Πx 320 in gamma-x may be constructed on demand. Similarly, the reference set Y 340 may be expanded on demand, and large parts of the reference set Y 340 may remain unexpanded.

These on-demand operations are supported by the OpenFst library (Allauzen et al., 2007). Specifically, to expand the RTNs into FSAs, the Replace operation may be used. To compute some data, any shortest path search algorithm may be applied. Computing the HyTER score may take 30 ms per sentence on networks by single annotators (combined all-annotator networks: 285 ms) if no reordering is used. These numbers increase to 143 ms (1.5 secs) for local reordering with window size 3, and 533 ms (8 secs) for window size 5. Many speedups for computing the score with reorderings are possible. However using reordering does not give consistent improvements.

As a by-product of computing the HyTER score, one can obtain the closest path itself, for error analysis. It can be useful to separately count the numbers of insertions, deletions, etc., and inspect the types of error. For example, one may find that a particular system output tends to be missing the finite verb of the sentence or that certain word choices were incorrect.

Meaning-equivalent networks may be used for machine translation evaluation. Experiments were designed to measure how well HyTER performs, compared to other evaluation metrics. For these experiments, 82 of the 102 available sentences were sampled, and 20 sentences were held out for future use in optimizing the metric.

Differentiating human from machine translation outputs may be achieved by scoring the set of human translations and machine translations separately, using several popular metrics, with the goal of determining which metric performs better at separating machine translations from human translations. To ease comparisons across different metrics, all scores may be normalized to a number between 0 (best) and 100 (worst). FIG. 6B shows the normalized mean scores for the machine translations and human translations under multiple automatic and one human evaluation metric (Likert). FIG. 6B is table 610 illustrating scores assigned to human versus machine translations under various metrics. Each score is normalized to range from 100 (worst) to 0 (perfect translation). The quotient of interest, m=h, is the mean score for machine translations divided by the mean score for the human translations. The higher this number, the better a metric separates machine from human produced outputs.

Under HyTER, m=h is about 1.9, which shows that the HyTER scores for machine translations are, on average, almost twice as high as for human translations. Under Likert (a score assigned by human annotators who compare pairs of sentences at a time), the quotient is higher, suggesting that human raters make stronger distinctions between human and machine translations. The quotient is lower under the automatic metrics Meteor (Version 1.3, (Denkowski and Lavie, 2011)), BLEU and TERp (Snover et al., 2009). These results show that HyTER separates machine from human translations better than alternative metrics.

Figure 7:
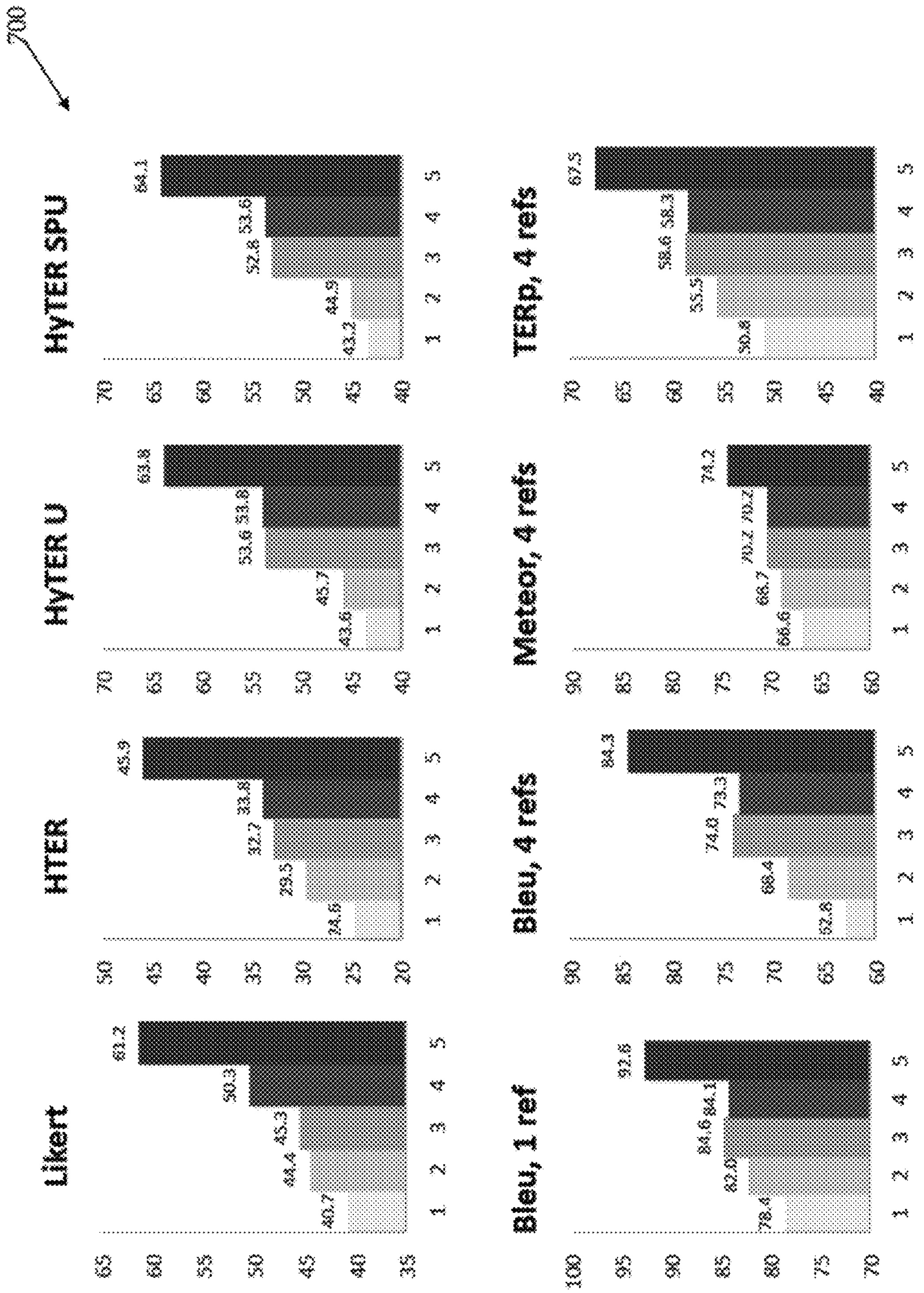
FIG. 7 compares rankings of five machine translation systems according to several widely used metrics.

The five machine translation systems are ranked according to several widely used metrics (see FIG. 7). The results show that BLEU, Meteor and TERp do not rank the systems in the same way as HTER and humans do, while the HyTER metric may yield a better ranking. Also, separation between the quality of the five systems is higher under HyTER, HTER, and Likert than under alternative metrics.

The current metrics (e.g., BLEU, Meteor, TER) correlate well with HTER and human judgments on large test corpora (Papineni et al., 2002; Snover et al., 2006; Lavie and Denkowski, 2009). However, the field of MT may be better served if researchers have access to metrics that provide high correlation at the sentence level as well. To this end, the correlation of various metrics with the Human TER (HTER) metric for corpora of increasingly larger sizes is estimated.

Language Testing units assess the translation proficiency of thousands of applicants interested in performing language translation work for the US Government and Commercial Language Service Organizations. Job candidates may typically take a written test in which they are asked to translate four passages (i.e., paragraphs) of increasing difficulty into English. The passages are at difficulty levels 2, 2+, 3, and 4 on the Interagency Language Roundable (ILR) scale. The translations produced by each candidate are manually reviewed to identify mistranslation, word choice, omission, addition, spelling, grammar, register/tone, and meaning distortion errors. Each passage is then assigned one of five labels: Successfully Matches the definition of a successful translation (SM); Mostly Matches the definition (MM); Intermittently Matches (IM); Hardly Matches (HM); Not Translated (NT) for anything where less than 50% of a passage is translated. There are a set of more than 100 rules that agencies practically use to assign each candidate an ILR translation proficiency level: 0, 0+, 1, 1+, 2, 2+, 3, and 3+. For example, a candidate who produces passages labeled as SM, SM, MM, IM for difficulty levels 2, 2+, 3, and 4, respectively, is assigned an ILR level of 2+.

The assessment process described above can be automated. To this end, the exam results of 195 candidates were obtained, where each exam result consists of three passages translated into English by a candidate, as well as the manual rating for each passage translation (i.e., the gold labels SM, MM, IM, HM, or NT). 49 exam results are from a Chinese exam, 71 from a Russian exam and 75 from a Spanish exam. The three passages in each exam are of difficulty levels 2, 2+, and 3; level 4 is not available in the data set. In each exam result, the translations produced by each candidate are sentence-aligned to their respective foreign sentences. The passage-to-ILR mapping rules described above are applied to automatically create a gold overall ILR assessment for each exam submission. Since the languages used here have only 3 passages each, some rules map to several different ILR ratings. FIG. 6C shows the label distribution at the ILR assessment level across all languages. FIG. 6C is table 620 illustrating the percentage of exams with ILR levels 0, 0+, . . . , 3+ as gold labels. Multiple levels per exam are possible.

The proficiency of candidates who take a translation exam may be automatically assessed. This may be a classification task where, for each translation of the three passages, the three passage assessment labels, as well as one overall ILR rating, may be predicted. In support of the assessment, annotators created an English HyTER network for each foreign sentence in the exams. These HyTER networks then serve as English references for the candidate translations. The median number of paths in these HyTER networks is 1.6 times 10 to the $6^{th}$ paths/network.

A set of submitted exam translations, each of which is annotated with three passage-level ratings and one overall ILR rating, is used. Features are developed that describe each passage translation in its relation to the HyTER networks for the passage. A classifier is trained to predict passage-level ratings given the passage-level features that describe the candidate translation. As a classifier, a multi-class support-vector machine (SVM, Krammer and Singer (2001)) may be used. In decoding, a set of exams without their ratings may be observed, the features derived, and the trained SVM used to predict ratings of the passage translations. An overall ILR rating based on the predicted passage-level ratings may be derived. A 10-fold cross-validation may be run to compensate for the small dataset.

Features describing a candidate's translation with respect to the corresponding HyTER reference networks may be defined. Each of the feature values is computed based on a passage translation as a whole, rather than sentence-by-sentence. As features, the HyTER score is used, as well as the number of insertions, deletions, substitutions, and insertions-or-deletions. These numbers are used when normalized by the length of the passage, as well as when unnormalized. N-gram precisions (for n=1, . . . , 20) are also used as features. The actual assignment of reputation may additionally be based on one or more of several other test-related factors.

Predicting the ILR score for a human translator, is not a requirement for performing the exemplary method described herein. Rather, it is one possible way to grade human translation proficiency. Reputation assignment according to the present technology can be done consistent with ILR, the American Translation Association (ATA) certification, and/or several other non-test related factors (for example price, response time, etc). The exemplary method shown herein utilizes ILR, but the same process may be applied for the ATA certification. The non-test specific factors pertain to creating a market space and enable the adjustment of a previous reputation based on market participation data.

The accuracy in predicting the overall ILR rating of the 195 exams is shown in table 630 of FIG. 6D. The results in two or better show how well a performance level of 2, 2+, 3 or 3+ can be predicted. It is important to retrieve such relatively good exams with high recall, so that a manual review QA process can confirm the choices while avoid discarding qualified candidates. The results show that high recall is reached while preserving good precision. Several possible gold labels per exam are available, and therefore precision and recall are computed similar to precision and recall in the NLP task of word alignment. As a baseline method, the most frequent label per language may be assigned. These are 1+ for Chinese, and 2 for Russian and Spanish. The results in FIG. 6D suggest that the process of assigning a proficiency level to human translators can be automated.

The present application introduces an annotation tool and process that can be used to create meaning-equivalent networks that encode an exponential number of translations for a given sentence. These networks can be used as foundation for developing improved machine translation evaluation metrics and automating the evaluation of human translation proficiency. Meaning-equivalent networks can be used to support interesting research programs in semantics, paraphrase generation, natural language understanding, generation, and machine translation.

Figure 4:
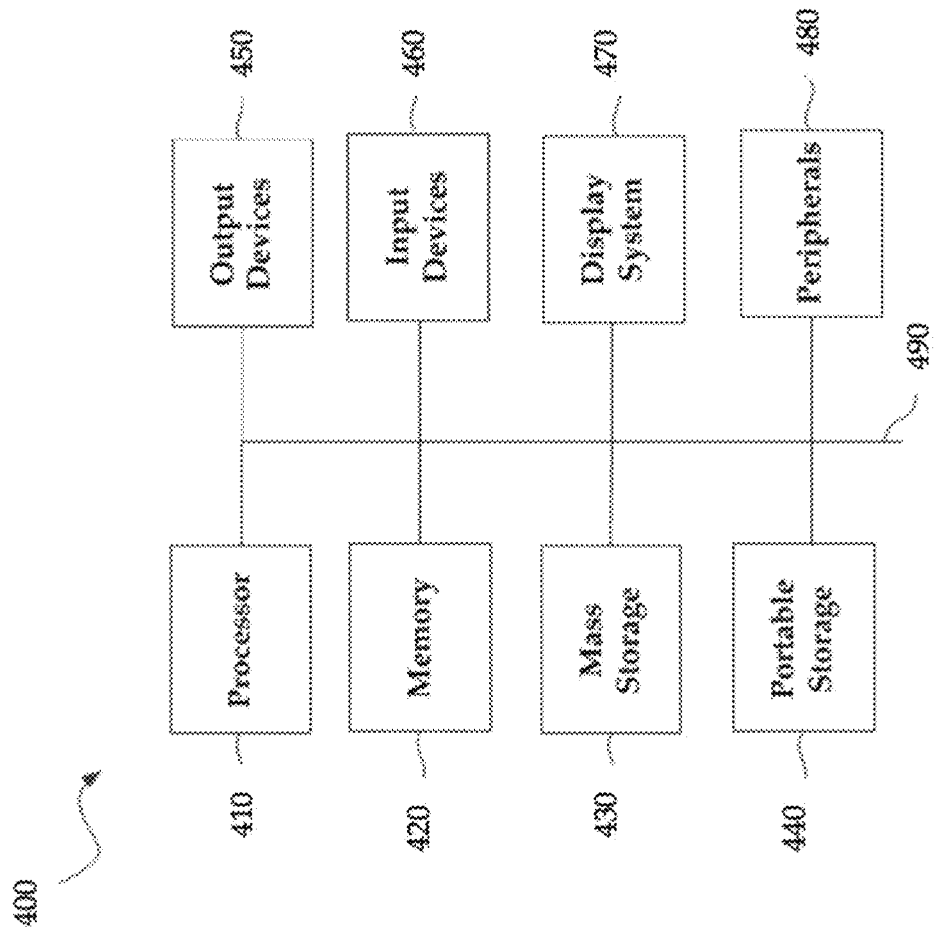
FIG. 4 illustrates an exemplary computing device that may be used to implement an embodiment of the present technology.

FIG. 4 illustrates exemplary computing device 400 that may be used to implement an embodiment of the present technology. The computing device 400 of FIG. 4 includes one or more processors 410 and main memory 420. Main memory 420 stores, in part, instructions and data for execution by the one or more processors 410. Main memory 420 may store the executable code when in operation. The computing device 400 of FIG. 4 further includes a mass storage device 430, portable storage medium drive(s) 440, output devices 450, user input devices 460, a display system 470, and peripheral device(s) 480.

The components shown in FIG. 4 are depicted as being connected via a single bus 490. The components may be connected through one or more data transport means. The one or more processors 410 and main memory 420 may be connected via a local microprocessor bus, and the mass storage device 430, peripheral device(s) 480, portable storage medium drive(s) 440, and display system 470 may be connected via one or more input/output (I/O) buses.

Mass storage device 430, which may be implemented with a magnetic disk drive or an optical disk drive, is a non-volatile storage device for storing data and instructions for use by the one or more processors 410. Mass storage device 430 may store the system software for implementing embodiments of the present invention for purposes of loading that software into main memory 420.

Portable storage medium drive(s) 440 operates in conjunction with a portable non-volatile storage medium, such as a floppy disk, compact disk, digital video disc, or USB storage device, to input and output data and code to and from the computing device 400 of FIG. 4. The system software for implementing embodiments of the present invention may be stored on such a portable medium and input to the computing device 400 via the portable storage medium drive(s) 440.

User input devices 460 provide a portion of a user interface. Input devices 460 may include an alphanumeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripheral device(s) 480 may include any type of computer support device to add additional functionality to the computer system. Peripheral device(s) 480 may include a modem or a router.

The components provided in the computing device 400 of FIG. 4 are those typically found in computer systems that may be suitable for use with embodiments of the present invention and are intended to represent a broad category of such computer components that are well known in the art. Thus, the computing device 400 of FIG. 4 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Figure 5:
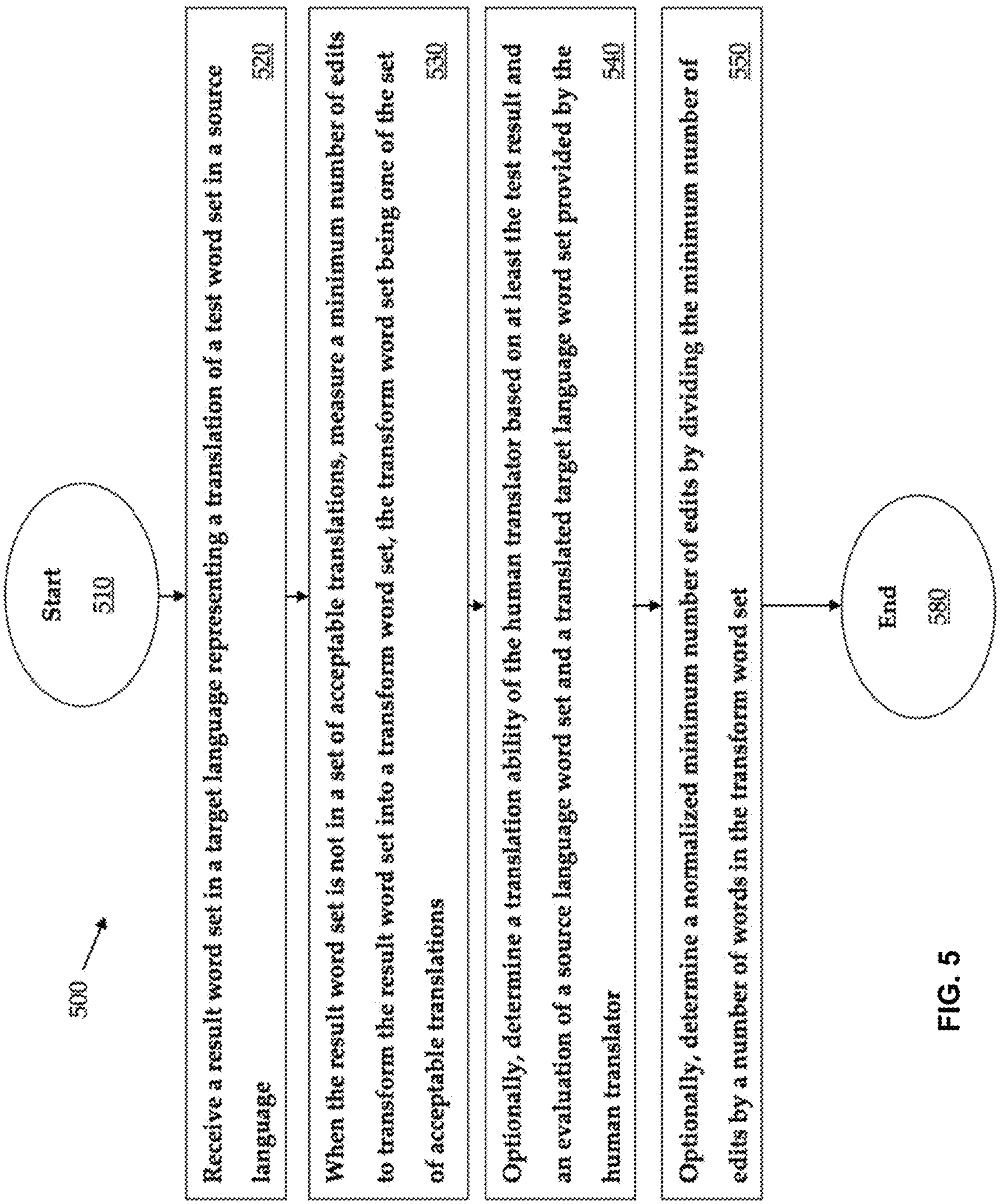
FIG. 5 is a flow chart illustrating an exemplary method.

FIG. 5 illustrates method 500 for evaluating the translation accuracy of a translator. Method 500 starts at start oval 510 and proceeds to operation 520, which indicates to receive a result word set in a target language representing a translation of a test word set in a source language. From operation 520, the flow proceeds to operation 530, which indicates, when the result word set is not in a set of acceptable translations, to measure a minimum number of edits to transform the result word set into a transform word set, the transform word set being one of the set of acceptable translations. From operation 530, the flow proceeds to operation 540, which indicates to, optionally, determine a translation ability of the human translator based on at least the test result and an evaluation of a source language word set and a translated target language word set provided by the human translator. From operation 540, the flow proceeds to operation 550, which indicates to, optionally, determine a normalized minimum number of edits by dividing the minimum number of edits by a number of words in the transform word set. From operation 550, the flow proceeds to end oval 560.

A human translator may provide the result word set, and the method may further include determining a test result of the human translator based on the minimum number of edits.

The method may include determining a translation ability of the human translator based on at least the test result and an evaluation of a source language word set and a translated target language word set provided by the human translator. The method may also include adjusting the translation ability of the human translator based on: 1) price data related to at least one translation completed by the human translator, 2) an average time to complete translations by the human translator, 3) a customer satisfaction rating of the human translator, 4) a number of translations completed by the human translator, and/or 5) a percentage of projects completed on-time by the human translator. In one implementation, the translation ability of a human translator may be decreased/increased proportionally to the 1) price a translator is willing to complete the work—higher prices lead to a decrease in ability while lower prices lead to an increase in ability, 2) average time to complete translations—shorter times lead to higher ability, 3) customer satisfaction—higher customer satisfaction leads to higher ability, 4) number of translations completed—higher throughput lead to higher ability, and/or 5) percentage of projects completed on time—higher percent leads to higher ability. Several mathematical formulas can be used for this computation.

The result word set may be provided by a machine translator, and the method may further include evaluating a quality of the machine translator based on the minimum number of edits.

When the result word set is in the set of acceptable translations, the result word set may be given a perfect score. The minimum number of edits may be determined by counting a number of substitutions, deletions, insertions, and moves required to transform the result word set into a transform word set.

The method may include determining a normalized minimum number of edits by dividing the minimum number of edits by a number of words in the transform word set.

The method may include forming the set of acceptable translations by combining at least a first subset of acceptable translations of the test word set provided by a first translator with a second subset of acceptable translations of the test word set provided by a second translator. The method may also include identifying at least first and second sub-parts of the test word set and/or combining a first subset of acceptable translations of the first sub-part of the test word set provided by the first translator with a second subset of acceptable translations of the first sub-part of the test word set provided by the second translator. The method may further includes combining a first subset of acceptable translations of the second sub-part of the test word set provided by the first translator with a second subset of acceptable translations of the second sub-part of the test word set provided by the second translator and/or combining each one of the first and second subsets of acceptable translations of the first sub-part of the test word set with each one of the first and second subsets of acceptable translations of the second sub-part of the test word set to form a third subset of acceptable translations of the word set. The method may include adding the third subset of acceptable translations to the set of acceptable translations.

The test result may be based on a translation, received from the human translator, of a test word set in a source language into a result word set in a target language. The test result may also be based on a measure of a minimum number of edits to transform the result word set into a transform word set when the result word set is not in a set of acceptable translations, the transform word set being one of the set of acceptable translations.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for saving processor computation time and memory of a computer system during automated scoring of a language translation using computation of a hybrid translation edit rate (HyTER) score, the method comprising:

receiving a result word set in a target language representing a translation of a test word set in a source language and an exponentially sized reference set;

generating a translation hypothesis for the result word set;

developing a search space for automated computation of a HyTER score for the translation hypothesis using a Levenshtein distance calculation between pairs of the search space comprising allowed permutations of the translation hypothesis within a fixed window size and parts of the exponentially sized reference set, the search space comprising a lazy composition;

identifying a pair in the search space having a minimum edit distance and highest HyTER score from the automated computation of the HyTER score using the Levenshtein distance calculations within the fixed window size; and outputting the automatically computed HyTER score and the allowed permutation of the translation hypothesis for the identified pair in the search space having the minimum edit distance and highest HyTER score, wherein the Levenshtein distance calculation is performed using the fixed window size so as to save the processor computation time and the memory of the computer system used for automated computation of the HyTER score.

2. The method according to claim 1, further comprising developing the search space for automated computation of the HyTER score, wherein the lazy composition is a weighted finite-state acceptor that represents a set of allowed permutations of the translation hypothesis and associated distance costs.

3. The method according to claim 1, further comprising calculating the HyTER score for the pairs in the search space to identify a pair in the search space having a minimum edit distance.

4. The method according to claim 1, further comprising reducing a number of pairs for the lazy composition for which the Levenshtein distance is calculated, using the fixed window constraints so as to save processor computation time and computer memory used for automated calculations of the HyTER score.

5. The method of claim 1, wherein calculating the HyTER score for each of the pairs in the search space further comprises saving computation time and memory by not explicitly constructing parts of the lazy composition.

6. The method according to claim 1, wherein the Levenshtein distance is calculated so as to save processor computation time and computer memory used for automated calculations of the HyTER score by constraining a number of paths constructed by the processor on demand by a weighted finite-state acceptor using a fixed window size, and not constructing permutation paths of the composition outside a window.

7. The method of claim 1, wherein the result word set is generated by a machine translation system.

8. The method of claim 7, wherein the translation hypothesis is provided by a machine translation system, and further comprising evaluating a quality of the machine translation system based on the minimum number of edits.

9. The method of claim 1, wherein when the translation hypothesis is in a set of acceptable translations of the exponentially sized reference set, the translation hypothesis is given a perfect score.

10. The method according to claim 1, wherein the exponentially sized reference set is encoded as a Recursive Transition Network stored in memory of the computing environment and expanded by the processor of the computing environment on demand.

11. The method of claim 10, wherein the minimum number of edits is determined by counting a number of substitutions, deletions, insertions, and moves required to transform the translation hypothesis into each encoded acceptable translation of the exponentially sized reference set of meaning equivalents expanded on demand from the Recursive Transition Network.

12. The method of claim 11, further comprising determining a normalized minimum number of edits by dividing the minimum number of edits by a number of words in the transformed word set.

13. The method of claim 1, further comprising forming a set of acceptable translations by combining at least a first subset of acceptable translations of the test word set provided by a first translator with a second subset of acceptable translations of the test word set provided by a second translator.

14. The method of claim 13, further comprising:

identifying at least first and second sub-parts of the test word set;

combining a first subset of acceptable translations of the first sub-part of the test word set provided by the first translator with a second subset of acceptable translations of the first sub-part of the test word set provided by the second translator;

combining a first subset of acceptable translations of the second sub-part of the test word set provided by the first translator with a second subset of acceptable translations of the second sub-part of the test word set provided by the second translator;

combining each one of the first and second subsets of acceptable translations of the first sub-part of the test word set with each one of the first and second subsets of acceptable translations of the second sub-part of the test word set to form a third subset of acceptable translations of the word set;

and adding the third subset of acceptable translations to the set of acceptable translations.

15. A system for saving processor computation time and computer memory of the system during automated scoring of a language translation using computation of a hybrid translation edit rate (HyTER) score, the system comprising:

a memory for storing executable instructions, a result word set in a target language representing a translation of a test word set in a source language, and an exponentially sized reference set; and a processor for executing the instructions stored in the memory, the executable instructions comprising:

receiving a result word set in a target language representing a translation of a test word set in a source language and an exponentially sized reference set;

generating a translation hypothesis for the result word set;

developing a search space for automated computation of a HyTER score for the translation hypothesis using a Levenshtein distance calculation between pairs of the search space comprising allowed permutations of the translation hypothesis within a fixed window and parts of the exponentially sized reference set, the search space comprising a lazy composition, identifying a pair in the search space having a minimum edit distance and highest HyTER score from the automated computation of the HyTER score using the Levenshtein distance calculations within the fixed window; and outputting the automatically computed HyTER score and the allowed permutation of the translation hypothesis for the identified pair in the search space having a minimum edit distance and highest HyTER score, wherein the Levenshtein distance calculation is performed using the fixed window so as to save the processor computation time and the computer memory of the system used for automated calculations of the HyTER score.

16. The system of claim 15, wherein the result word set is received from a human translator, and wherein a translation ability of the human translator based on the HyTER score is output to the human translator.

17. The system of claim 16, wherein a test result is stored in the memory as an indicator of a translation ability of the human translator, and wherein the translation ability of the human translator is adjusted based on at least one of:

price data related to at least one translation completed by the human translator;

an average time to complete translations by the human translator;

a customer satisfaction rating of the human translator;

a number of translations completed by the human translator; and a percentage of projects completed on-time by the human translator.

18. The system of claim 15, further comprising a machine translator interface for receiving the result word set from a machine translator, wherein a quality of the machine translator is evaluated based on the minimum number of edits.

19. The system of claim 18, wherein when the minimum edit distance for the identified pair is zero, the result word set is given a perfect HyTER score.

20. The system of claim 19, wherein the minimum number of edits to transform the result word set into the transform word set comprises a minimum number of substitutions, deletions, insertions, and moves, and further comprising a transformer to identify the minimum number of substitutions, deletions, insertions, and moves.

* * * * *